United States Patent [19]
Suzuki et al.

[11] Patent Number: 5,710,611
[45] Date of Patent: Jan. 20, 1998

[54] LIQUID CRYSTAL DISPLAY APPARATUS PREVENTING IMAGE ON SCREEN FROM INFLUENCES OF DISCLINATION LINE

[75] Inventors: Teruaki Suzuki; Ken-Ichi Takatori; Ken Sumiyoshi; Masayoshi Suzuki, all of Tokyo, Japan

[73] Assignee: NEC Corporation, Tokyo, Japan

[21] Appl. No.: 559,828

[22] Filed: Nov. 17, 1995

[30] Foreign Application Priority Data

| Nov. 17, 1994 | [JP] | Japan | 6-283398 |
| Nov. 28, 1994 | [JP] | Japan | 6-292867 |
| Jan. 25, 1995 | [JP] | Japan | 7-009846 |

[51] Int. Cl.⁶ ............ G02F 1/1343; G02F 1/1357
[52] U.S. Cl. ............ 349/129; 349/78; 349/139
[58] Field of Search ............ 359/76, 78, 87; 349/132, 134, 138, 139, 129, 38

[56] References Cited

U.S. PATENT DOCUMENTS

| 4,733,948 | 3/1988 | Kitahara et al. | 359/75 |
| 5,194,177 | 3/1993 | Nohira et al. | 359/105 |
| 5,229,873 | 7/1993 | Hirose et al. | 359/87 |
| 5,249,070 | 9/1993 | Takano | 359/75 |
| 5,280,375 | 1/1994 | Tsuda et al. | 359/78 |
| 5,309,264 | 5/1994 | Lien et al. | 359/77 |
| 5,416,619 | 5/1995 | Koike | 359/76 |
| 5,446,569 | 8/1995 | Iwai et al. | 359/78 |
| 5,473,455 | 12/1995 | Koike et al. | 359/76 |
| 5,479,282 | 12/1995 | Toko et al. | 359/75 |
| 5,504,604 | 4/1996 | Takatori et al. | 359/75 |
| 5,510,916 | 4/1996 | Takahashi | 359/67 |

FOREIGN PATENT DOCUMENTS

| 57-186735 | 11/1982 | Japan |
| 58-43723 | 9/1983 | Japan |
| 59-211019 | 11/1984 | Japan |
| 60-211422 | 10/1985 | Japan |
| 61-47932 | 3/1986 | Japan |
| 63-106624 | 5/1988 | Japan |
| 64-88520 | 4/1989 | Japan |
| 1-245223 | 9/1989 | Japan |
| 4-7520 | 1/1992 | Japan |
| 5-173137 | 7/1993 | Japan |
| 5-173138 | 7/1993 | Japan |
| 5-173142 | 7/1993 | Japan |
| 5-203951 | 8/1993 | Japan |
| 6-43460 | 2/1994 | Japan |
| 6-148650 | 5/1994 | Japan |

*Primary Examiner*—William L. Sikes
*Assistant Examiner*—Toan Ton
*Attorney, Agent, or Firm*—Foley & Lardner

[57] ABSTRACT

A liquid crystal display panel confines liquid crystal between a first orientation film over pixel electrodes and a second orientation film over a common electrode, and differently oriented areas of the first orientation film form boundaries extending over the pixel electrodes and between the pixel electrodes and gate/drain bus lines so as to align electric lines of force in the electric field with directions of liquid crystal molecules on both sides of each boundary, thereby stably controlling a disclination line at a predetermined position outside of open areas over the pixel electrodes.

6 Claims, 19 Drawing Sheets

LIQUID CRYSTAL DISPLAY APPARATUS PREVENTING IMAGE ON SCREEN FROM INFLUENCES OF DISCLINATION LINE

FIELD OF THE INVENTION

This invention relates to a liquid crystal display apparatus and, more particularly, to a liquid crystal display apparatus effective against a disclination line.

DESCRIPTION OF THE RELATED ART

A standard liquid crystal display apparatus has liquid crystal sandwiched between substrates. If the liquid crystal is the twisted nematic type, orientation films cover the surfaces of the substrates, and the twisted nematic liquid crystal is sandwiched between the orientation films. The twisted nematic liquid crystal consists of liquid crystal molecules gradually changing the direction of the major axes from one of the orientation films to the other orientation film, and the major axes of the liquid crystal molecules on the one orientation film differ from the major axes of the liquid crystal molecules on the other orientation film at a right angle. The liquid crystal molecules on the orientation films are pre-tilted to the surfaces of the orientation films. The direction of the liquid crystal molecules and the direction of the pre-tilt are usually controlled by a rubbing. However, the directions are also controllable by using oblique evaporation of the orientation films.

When the electric field across the twisted nematic liquid crystal is varied, the twisted nematic liquid crystal changes the optical transmittance and, accordingly, the gradation, and reproduces an image on the twisted nematic liquid crystal display apparatus. Even if the optical transmittance is constant, the brightness is varied depending upon the viewing angle. This means that the liquid crystal display apparatus has a problem with a narrow viewing angle. In other words, the image is seen to be whitish and blackish depending upon the position in front of the liquid crystal display apparatus.

The variation of the gradation depending upon the viewing angle is derived from the asymmetry of the oriented liquid crystal molecules. The directions of the liquid crystal molecules in the electric field are determined by the directions of pre-tilt and the direction of the electric field. The direction of the electric field is generally perpendicular to the substrate except for the end portions of the substrate, and, for this reason, the directions of the liquid crystal molecules in the electric field are dominated by the directions of the pre-tilt. The angle between the direction without the electric field and the direction under the electric field is dependent on the magnitude of the potential applied to the substrates. If the magnitude of the potential is controlled, the image changes the gradation. The motion of the liquid crystal molecules is smaller around the surfaces of the substrates than the intermediate zone therebetween. As a result, the liquid crystal molecules in the intermediate zone dominate the brightness under the application of potential to the substrates. When a person sees an image in the directions of liquid crystal molecules under the application of the electric field, the image is reproduced to be whitish. On the other hand, when the person sees the image from the opposite position, the image is seen to be blackish.

The problem, i.e., the narrow viewing angle, is also encountered in a homogeneous molecular alignment type liquid crystal display apparatus. The homogeneous molecular alignment type liquid crystal display apparatus orients the liquid crystal sandwiched between substrates parallel to the surfaces of the substrates, and polarizing plates are provided on the outer surfaces of the substrates. When a potential is applied, the liquid crystal molecules rise up, and the magnitude of double refraction is changed. The optical transmittance is controlled by changing the potential applied to the substrates. In this instance, the direction of pre-tilt affects the direction of the rising liquid crystal molecules, and the problem of the viewing angle dependency is encountered in the homogeneous molecular alignment type liquid crystal display apparatus similarly to the twisted nematic type liquid crystal display apparatus.

Japanese Patent Publication of Examined Application No. 58-43723 discloses a liquid crystal structure improved in viewing angle. The prior art liquid crystal structure has miniature domains arranged at a small pitch, and the miniature domains are alternately opposite in liquid-crystal direction to one another. The pieces of liquid crystal in the respective miniature domains rise up at different angles under the application of potential. For this reason, when an image is reproduced on the prior art liquid crystal structure, the viewing-angle characteristics are averaged among the miniature domains, and an observer recognizes the image in the average viewing-angle characteristics. Thus, the miniature domains compensate the viewing angle dependency, and the observer sees the image better than an image reproduced on the standard prior art liquid crystal display apparatus.

When dividing the liquid crystal into pieces different in alignment, a defect called a disclination line takes place, and deteriorates the contrast. The disclination line is derived from a discontinuity of the liquid crystal direction. In order to prevent an image reproduced on a liquid crystal display apparatus from deterioration by the disclination line, it is effective to suppress the disclination line on the pixel electrode or to provide a shading film for hiding the disclination line. However, these countermeasures requires a designer to exactly forecast the point where the disclination line takes place, and the designer requires a manufacturer to exactly control the liquid-crystal molecule directions for forecasting the position of the disclination line. However, the angle of the liquid-crystal molecule direction under the application of the potential is strongly affected by the orientation process for the liquid crystal, and a lateral electric field between the pixel electrodes and the gate/drain bus lines further influences the angle of the liquid-crystal molecule direction. The disclination line is hardly able to be forecasted. The gate bus lines and the drain bus lines are signal lines arranged in matrix for driving selected pixels.

Japanese Patent Publication of Unexamined Application No. 6-43460 discloses a liquid crystal structure designed with consideration of the influence of the lateral electric field taken into account. According to the Japanese Patent Publication of Unexamined Application, the orientation films are divided into miniature domains with respect to the gate bus lines, and the miniature domains are differently oriented. When a potential is applied, the liquid crystal molecules are directed to the gate bus lines. In this prior art, the directions of the liquid crystal molecules under influence of the different rubbing on the orientation films are matched with the directions of the liquid crystal molecules due to the lateral electric field between the gate bus lines and the pixel electrodes, and the pieces of liquid crystal in the miniature domains are stably oriented.

A liquid crystal display apparatus of the type driving pixels with active elements is called an active matrix type liquid crystal display apparatus, and storage capacitors are usually coupled in parallel to the pixel capacitances so as to hold the potential applied to the pixels. In this instance, if the pixel electrodes are partially overlapped with gate bus lines different from those coupled to the active elements driving the pixels, the storage capacitors are easily provided without decreasing an aperture ratio. This feature is called a gate storage structure.

A liquid crystal display apparatus with the gate storage structure creates a lateral electric field different from the lateral electric field in the liquid crystal display apparatus without the gate storage structure, because the pixel electrodes are partially overlapped with the gate bus lines. For this reason, even if the orientation films are divided into the miniature domains differently oriented with respect to the boundaries under the gate bus lines as taught by Japanese Patent Publication of Unexamined Application No. 6-43460, the liquid crystal molecule directions in the miniature domains are unstable, and the disclination line sometimes takes place in a central area of a pixel opening. The disclination line degrades a contrast ratio. If the disclination line differently takes place in the pixels, an image is liable to be deformed and burnt in the screen of the liquid crystal display apparatus, and an after image tends to be produced on the screen.

If the pixels are miniaturized in the liquid crystal display apparatus without the gate storage structure, the gap between the pixels and the gate bus lines becomes narrow, and a strong lateral electric field is created between the pixels and the gate bus lines, and makes the liquid crystal molecule directions in the miniature domains unstable. This results in the same problems as the liquid crystal display apparatus with the gate storage structure. The disclination line is hereinbefore described in connection with the gate bus lines. The disclination line also takes place due to drain bus lines. The gap between the pixel electrodes and the drain bus lines becomes narrow together with the miniaturization of the pixels, and the liquid crystal molecule directions in the miniature domains are unstable even if the miniature domains individually are oriented in different directions.

Although the pieces of liquid crystal individually oriented in the miniature domains increase the viewing angle, the problem is encountered in a prior art liquid crystal display apparatus in the unstable liquid crystal molecule directions, and the unstable liquid crystal molecule directions result in the disclination line in the central area of the pixel opening, the reduction of the contrast patio, the deformed image, the burnt image and the after image.

Japanese Patent Publication of Unexamined Application Nos. 59-211019, 63-106624 and 5-173142 also disclose liquid crystal display apparatus having the miniature domains differently oriented. In order to make the second problem clear, the prior art liquid crystal display panel disclosed in Japanese Patent Publication of Unexamined Application No. 5-173142 is described in detail.

FIGS. 1, 2 and 3 illustrate the layout of the prior art liquid crystal display panel disclosed in Japanese Patent Publication of Unexamined Application No. 5-173142. As shown in FIGS. 1 and 2, a unit area 1 is defined by adjacent two signal electrode lines 2a and 2b and adjacent two scanning electrode lines 3a and 3b, and is divided into two domains 1a and 1b. The boundary between the domains 1a and 1b is across an indium tin oxide (ITO) pixel electrode 4 in parallel to the scanning electrode lines 3a and 3b. Thin film transistors 5a and 5b have a redundant configuration, and are symmetrical with respect to a center line of the pixel electrode 4.

A storage capacitor electrode 6 is provided on a surface of a first substrate 7a, and an insulating layer 8 covers the surface of the first substrate 7a and, accordingly, the storage capacitor electrode 6. The insulating layer 8 is overlain by the pixel electrode 4, and an orientation film 9a covers the pixel electrode 4. Color filters 10a and 10b are provided on an inner surface of a second substrate 7b, and form red, green and blue pixel areas. A photo-shield layer 11 is further provided on the inner surface of the second substrate 7b, and defines apertures for the red, blue ad green areas. A transparent protective layer 12 covers the color filters 10a and 10b and the photo-shield layer 11. A transparent electrode 13 is laminated on the transparent protective layer 12, and is overlain by an orientation film 9b. Liquid crystal 14 fills the gap between the orientation films 9a and 9b.

As will be seen in FIG. 3, when an electric field 15 is created across the liquid crystal 14, the liquid crystal molecules represented by short bars change the directions of the major axes along the electric lines of force, and are pre-tilted toward the scanning electrode line 3a.

Thus, the directions of twist are identical between the domains 1a and 1b, but the tilt directions are different under the application of potential. This feature is desirable, because the domains 1a and 1b compensate the optical characteristics to oblique incident light, and the prior art liquid crystal display panel achieves electro-optic characteristics less dependent on the viewing angle. Especially, the gradation of an image reproduced on the prior art liquid crystal display panel is less dependent on the viewing angle, and the inversion is less liable to take place.

FIGS. 4A and 4B illustrates a disclination line. References 20, 21, 22, 23 designate thin film transistors, pixel electrodes, gate bus lines (or scanning electrode lines) and drain bus lines (or signal electrode lines), respectively, and dash lines 24 are indicative of boundaries of domains. Though not shown in FIGS. 4A and 4B, the first substrate and the second substrate are oriented in the directions indicated by arrows 25a and 25b. The disclination line takes place as indicated by real lines 26, and extends over the boundaries 24.

While the lateral components of electric lines of force due to the gate bus lines 22 and the drain bus lines 23 do not strongly affect the liquid crystal molecules, the disclination line 26 extends over the gate bus lines 22, side edges of the drain bus lines 23 and the boundary aligned with the center line of the pixel electrode 21 as shown in FIG. 4A. The disclination line 26 ranges from 5 microns to 10 microns in width, and a narrow shading member over the center line of the pixel electrode 21 hides the disclination line 26.

However, when an animation or an black image is being displayed over the pixels, the lateral components of the electric lines of force are enlarged, and the disclination line 26 is widely warped, and projects into open areas over the pixel electrodes 21 as shown in FIG. 4B. The movement of the disclination line is recognized as an after image.

The disclination line 26 causes the optical transmittance to fluctuate, and, for this reason, the black image becomes whitish due to the increase of the optical transmittance. In the actual image reproduction, the disclination line is causative of a burnt image and undesirable bright stops from an oblique angle, and deteriorates the reproduced image.

Japanese Patent Publication of Unexamined Application No. 5-173138 discloses a liquid crystal display panel, and shading members are incorporated in the prior art liquid crystal display panel. The storage capacitor electrode 6 (see FIGS. 1 and 2) behaves similar to the shading members of the prior art liquid crystal display panel disclosed in Japanese Patent Publication of Unexamined Application No. 5-173138. The shading members hide the disclination line extending along the boundaries, and prevent a black image from the undesirable influences due to the enhanced optical transmittance. The shading members are effective against the burnt image and the bright spots from the oblique viewing point.

However, even if the shading members are provided in the liquid crystal display apparatus, the disclination line is not perfectly eliminated from the screen, and a burnt image or bright spots are sometimes observed on the screen. This is because of the fact that not only the divided miniature domains but also the electric field are causative of the disclination line. In other words, the energy stability of the liquid crystal over the boundary is affected by the energy variation due to the electric field as well as the energy of the liquid crystal direction. These factors deform the disclination line produced over the boundary at the central portion of the pixel, and the disclination line is deformed so as to be seen under the shading members. Especially, the disclination line is liable to be deformed at end portions of the pixel rather than the central portion, and the uncontrollable disclination line results in the burnt image and the bright spots.

Japanese Patent Publication of Unexamined Application Nos. 57-186735, 60-211422, 63-106624, 64-88520, 1-245223 and 5-203951 similarly disclose liquid crystal display apparatus, and a pixel divided into differently oriented domains is a feature of these prior art liquid crystal display apparatus.

Known orientation technologies are an oblique deposition of silicon oxide and a rubbing carried out on a thin film of polyimide. Available polyimide is disclosed in Japanese Patent Publication of Unexamined Application Nos. 61-47932 and 6-148650. Another available polyimide is known as SE-7311 manufactured by Nissan Chemical Corporation and AL1051 manufactured by Nippon Synthetic Rubber Corporation.

If the plurality of miniature domains are formed through rubbing, it is necessary to change the direction of the rubbing in the narrow area assigned to a pixel. Japanese Patent Publication of Unexamined Application Nos. 60-211422, 5-203951 and 5-173137 disclose the rubbing techniques.

The rubbing technique disclosed in Japanese Patent Publication of Unexamined Application No. 60-211422 traces the following sequence. First, a miniature area assigned to a pixel on an orientation film is rubbed in one direction, and is partially covered with a photo-resist layer. The exposed area is rubbed again in a different direction, and the photo-resist layer is removed from the orientation film. The sequence is repeated, and the orientation film is differently oriented.

On the other hand, Japanese Patent Publication of Unexamined Application Nos. 5-173137 and 5-203951 teach the following sequence. One of the substrates is subjected to the split orientation, i.e., differently oriented domains, and the other substrate has a uniform orientation. The pre-tilt angle for the split oriented substrate is adjusted to the pre-tilt angle for the uniformly oriented substrate or a larger angle than the pre-tilt angle for the uniformly oriented substrate. The orientation of the liquid crystal layer is dominated by the split oriented substrate.

When each of the pixel areas is split into domains differently oriented, a disclination line takes place along the boundaries between the domains, and light leaks through the disclination line. This results in deterioration of contrast. A shading member prevents an image produced on a screen from poor contrast. However, if the shading member is wide, the wide shading member decreases the aperture ratio, and makes the screen dark. For this reason, the shading member is usually narrow so as to maintain a large aperture ratio.

If the shading member is narrow, the disclination line is deformed so as to be seen under the narrow shading member, and the leakage light deteriorates the contrast. In detail, if the disclination line exactly extends along the boundaries, the narrow shading member can hide the disclination line. However, the lateral electric field widely warps the disclination line in the periphery of the pixel, and the shading member is partially widened in the periphery.

Thus, the prior art liquid crystal display apparatus requires a partially widened shading member so as to hide the disclination line, and the small aperture ratio makes the screen dark.

SUMMARY OF THE INVENTION

It is therefore an important object of the present invention to provide a liquid crystal display apparatus which is free from a burnt image, an after image, bright spots and a low contrast due to a disclination line.

To accomplish the object, the present invention proposes to align electric lines of force in an electric field across a liquid crystal layer with directions of pre-tilt of liquid crystal molecules around a boundary between differently oriented areas on orientation films.

To accomplish the object, the present invention proposes to cause an orientation film covering a common electrode to differently orient liquid crystal.

In accordance with one aspect of the present invention, there is provided a liquid crystal display apparatus comprising: a first substrate structure including a plurality of gate bus lines, a plurality of drain bus lines electrically isolated from the plurality of gate bus lines and defining a plurality of areas together with the plurality of gate bus lines, a plurality of pixel electrodes respectively formed in the plurality of areas and electrically isolated from the plurality of gate bus lines and the plurality of drain bus lines, a plurality of switching transistors respectively associated with the plurality of pixel electrodes, each of the plurality of switching transistors having a source-to-drain path coupled between an associated one of the plurality of pixel electrodes and one of the drain bus lines and a gate coupled to one of the plurality of gate bus lines, and a first orientation film covering the plurality of gate bus lines, the plurality of drain bus lines, the plurality of pixel electrodes and the plurality of switching transistors and divided into a plurality of sub-areas every adjacent two of which are oriented in different directions, the plurality of sub-areas forming first boundaries extending over the plurality of pixel electrodes and second boundaries each extending over a vacant area between one of the plurality of pixel electrodes and one of the gate bus line and the drain bus line coupled to one of the plurality of switching transistors associated with the one of the plurality of pixel electrodes; a second substrate structure including a common electrode opposed to the plurality of pixel electrodes, and a second orientation film covering the common electrode and forming a gap together with the first orientation film; and liquid crystal filling the gap.

In accordance with another aspect of the present invention, there is provided a liquid crystal display apparatus comprising: a first substrate structure including a plurality of gate bus lines, a plurality of drain bus lines electrically isolated from the plurality of gate bus lines and defining a plurality of areas together with the plurality of gate bus lines, a plurality of pixel electrodes respectively formed in the plurality of areas and electrically isolated from the plurality of gate bus lines and the plurality of drain bus lines, a plurality of switching transistors respectively associated with the plurality of pixel electrodes, each of the plurality of switching transistors having a source-to-drain path coupled between an associated one of the plurality of pixel electrodes and one of the drain bus lines and a gate coupled to one of the plurality of gate bus lines, and a first orientation film covering the plurality of gate bus lines, the plurality of drain bus lines, the plurality of pixel electrodes and the plurality of switching transistors; a second substrate structure including a common electrode opposed to the plurality of pixel electrodes, and a second orientation film covering the common electrode and forming a gap together with the first orientation film, the second orientation film being divided into a plurality of sub-areas every adjacent two of which are oriented in different directions; and liquid crystal filling the gap and having first liquid crystal molecules adjacent to the first orientation film and second liquid crystal molecules adjacent to the second orientation film, pre-tilt angles of the first liquid crystal molecules being smaller than pre-tilt angles of the second liquid crystal molecules.

In accordance with yet another aspect of the present invention, there is provided a liquid crystal display panel comprising: a first substrate structure including a plurality of gate bus lines, a plurality of drain bus lines electrically isolated from the plurality of gate bus lines and defining a plurality of areas together with the plurality of gate bus lines, a plurality of pixel electrodes respectively formed in the plurality of areas and electrically isolated from the plurality of gate bus lines and the plurality of drain bus lines, a plurality of switching transistors respectively associated with the plurality of pixel electrodes, each of the plurality of switching transistors having a source-to-drain path coupled between an associated one of the plurality of pixel electrodes and one of the drain bus lines and a gate coupled to one of the plurality of gate bus lines, and a first orientation film covering the plurality of gate bus lines, the plurality of drain bus lines, the plurality of pixel electrodes and the plurality of switching transistors and divided into a plurality of sub-areas every adjacent two of which are oriented in different directions so as to form a boundary over each of the plurality of pixel electrodes; a second substrate structure including a common electrode opposed go the plurality of pixel electrodes, and a second orientation film covering the common electrode and forming a gap together with the first orientation film, the common electrode having a plurality of slits each aligned with the boundary over the associated pixel electrode; and liquid crystal filling the gap.

BRIEF DESCRIPTION OF THE DRAWINGS

The features and advantages of the liquid crystal display apparatus according to the present invention will be more clearly understood from the following description taken in conjunction with the accompanying drawings in which.

DESCRIPTION OF THE PREFERRED EMBODIMENTS

First Embodiment

Figure 5:
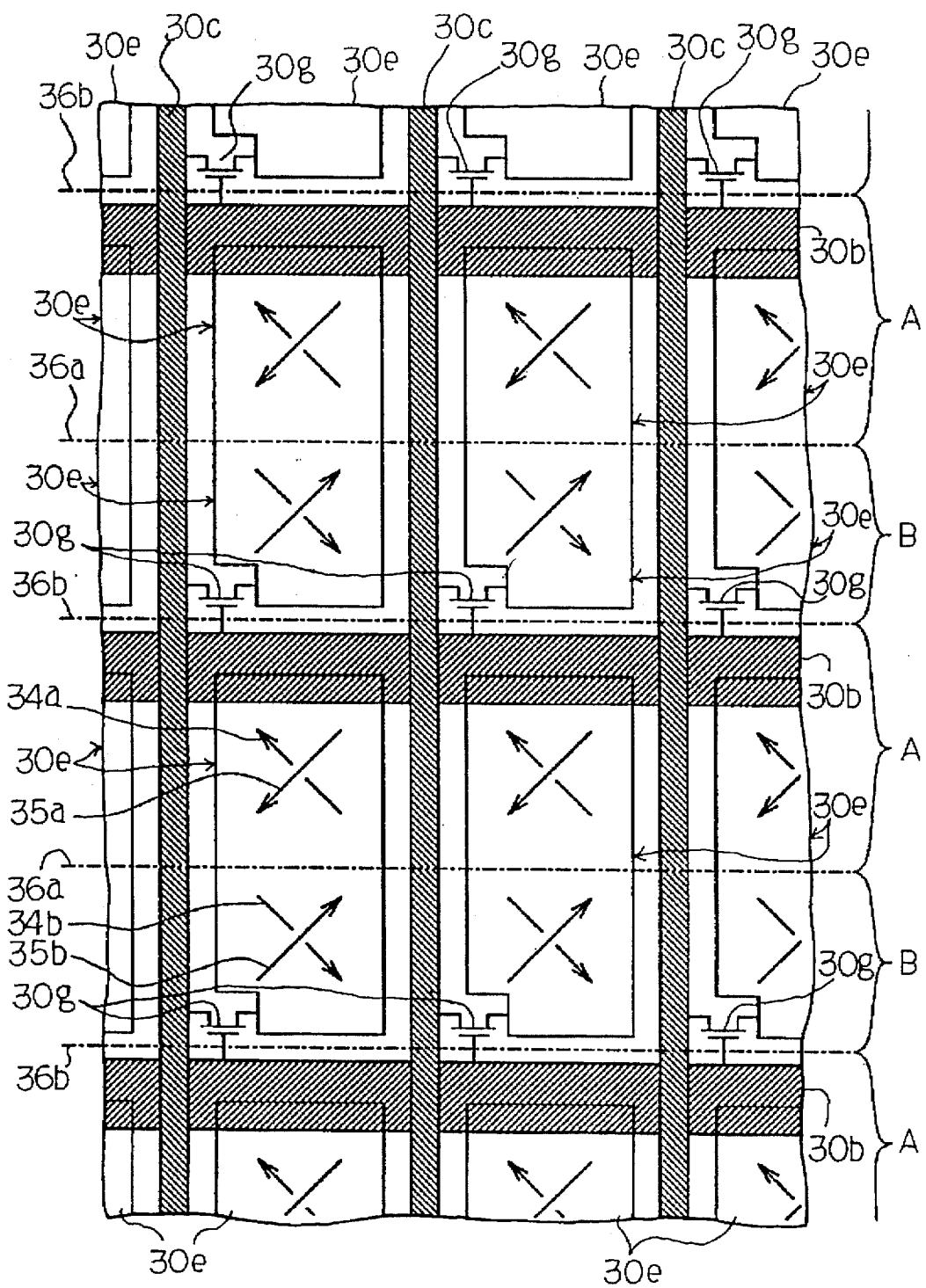
FIG. 5 is a plan view showing the layout of pixel electrodes, gate bus lines and drain bus lines incorporated in a liquid crystal display panel according to the present invention.
Figure 6:
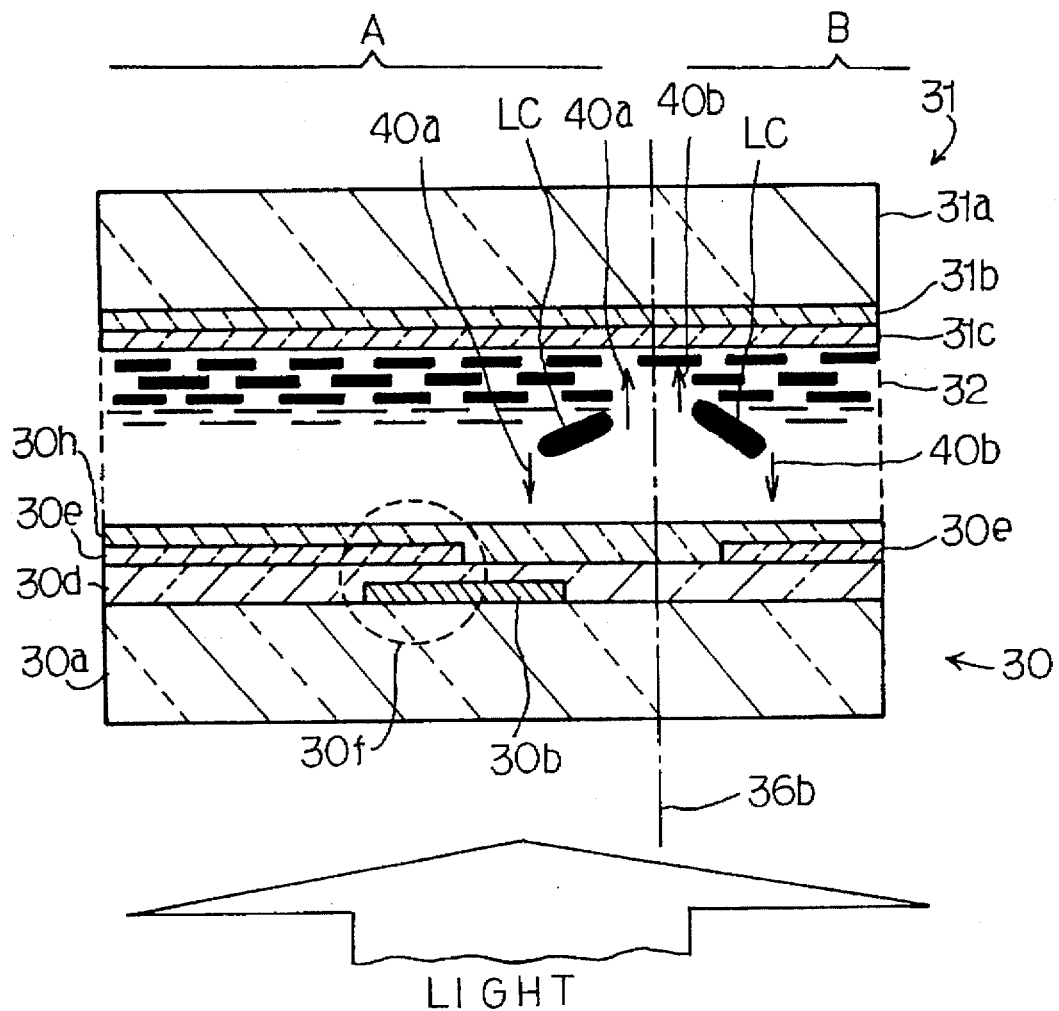
FIG. 6 is a cross sectional view showing the structure of the liquid crystal display panel.

Referring first to FIG. 6 of the drawings, a liquid crystal display panel embodying the present invention largely comprises a first substrate structure 30, a second substrate structure 31 spaced from the first substrate structure 30 and liquid crystal 32 filling the gap between the first substrate structure 30 and the second substrate structure 31. FIG. 5 illustrates the liquid crystal display panel from the view point over the second substrate structure 31.

The first substrate structure 30 includes a first substrate 30a, a plurality of gate bus lines 30b extending at intervals and a plurality of drain bus lines 30c extending in perpendicular to the gate bus lines 30b at intervals and electrically isolated from the gate bus lines 30b. Although the gate bus lines 30b and the drain bus lines 30c are hatched in FIG. 5, the hatching lines aims at easy discrimination of the gate/drain bus lines 30b and 30c from the other component members. In the following description, term "row" means the direction in which the gate bus lines 30b extend, and term "column" represents the direction in which the drain bus lines 30c extend.

The first substrate structure 30 further includes an insulating layer 30d covering the gate bus lines 30b and the drain bus lines 30c and a plurality of pixel electrodes 30e arranged in rows and columns on the insulating layer 30d. Each of the pixel electrodes 30e is assigned a generally rectangular area, and two gate bus lines 30b and two drain bus lines 30c extend along the two short end lines and the two long side lines of the generally rectangular area. The pixel electrodes 30e respectively define pixels of a screen where an image or images are produced.

Each of the gate bus lines 30b is partially overlapped with the pixel electrodes 30e of the adjacent row, and storage capacitors 30f are formed in the overlapped areas between the gate bus lines 30b and the pixel electrodes 30e.

The first substrate structure 30 further includes a plurality of switching transistors 30g respectively associated with the pixel electrodes 30e. In this instance, the switching transistors 30g are respectively implemented by metal-insulator-semiconductor type field effect transistors. The gate electrodes of the switching transistors 30g are selectively coupled to the gate bus lines 30b, and the source-to-drain paths are coupled between the associated pixel electrodes 30e and the drain bus lines 30c.

The first substrate structure 30 further includes a first orientation film 30h covering the pixel electrodes 30e and the exposed surface of the insulating layer 30d, and the liquid crystal 32 is in contact with the first orientation film 30h.

On the other hand, the second substrate structure 31 includes a second substrate 31a, a common electrode 31b formed on an inner surface of the second substrate 31a and a second orientation film 31c covering the common electrode 31b. The second orientation film 31c is in contact with the liquid crystal 32.

The first and second orientation films 30h and 31c are split into stripe areas A and B, and the stripe areas A are differently oriented from the stripe areas B. Arrows 34a and 34b represent a direction of the orientation in the stripe area A and a direction of the orientation in the stripe area B of the first orientation film 30h, and arrows 35a and 35b represent a direction of the orientation in the stripe area A and a direction of the orientation in the stripe area B of the second orientation film 31c.

The boundary between the adjacent stripe areas A and B is designated by reference numeral 36a or 36b. The boundaries 36a and 36b extend in parallel to the gate bus lines 30b. Each of the boundaries 36a is aligned with center lines of the pixel electrodes 30e of a row, and each of the boundaries 36b passes between the short end lines of the pixel electrodes 30e of a row and the gate bus line 30b coupled to the gate electrodes of the switching transistors 30g associated with the row of pixel electrodes 30e. Though not shown in FIG. 6, the second substrate structure may include shading members formed over the boundaries 36A, the gate bus lines 30b and the drain bus lines 30c. Color filters may be further incorporated in the second substrate structure 31.

FIGS. 7A to 7E illustrate a rubbing process for forming the stripe areas A and B. Both of the first and second orientation films 30h and 31c are formed through the rubbing process, and description is made for the first orientation film 30h only.

Figure 7A:
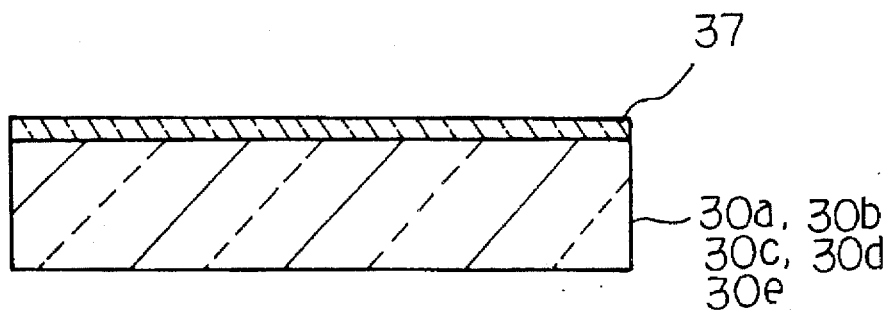
FIGS. 7A to 7E are cross sectional views showing a rubbing sequence for orientating organic compound films.

When the pixel electrodes 30e are patterned on the insulating layer 30d, an organic compound film 37 is provided over the pixel electrodes 30e as shown in FIG. 7A. In this instance, the organic compound is polyimide called as SE-7210 manufactured by Nissan Chemical Corporation.

Figure 7B:
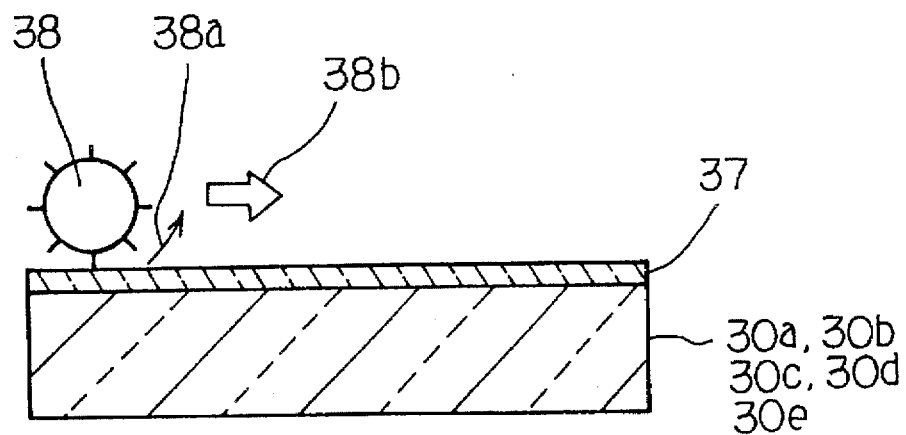

A rubbing roller 38 is prepared, and a buff cloth such as rayon sheet is wound on a rotating member. The rubbing roller 38a is rotated in the direction of arrow 38a, and advances in the direction of arrow 38b. The rubbing roller 38 is held in contact with the organic compound film 7, and the organic compound film 37 is rubbed by the rubbing roller 38 as shown in FIG. 7B.

Figure 7C:
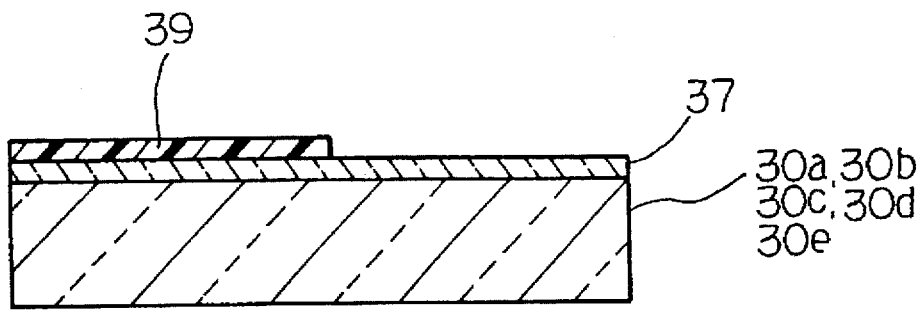
Figure 7D:
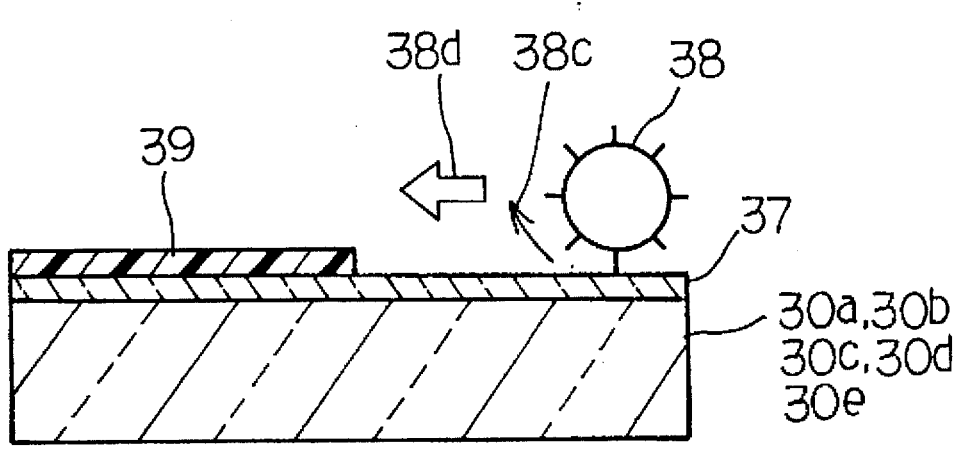
Figure 7E:
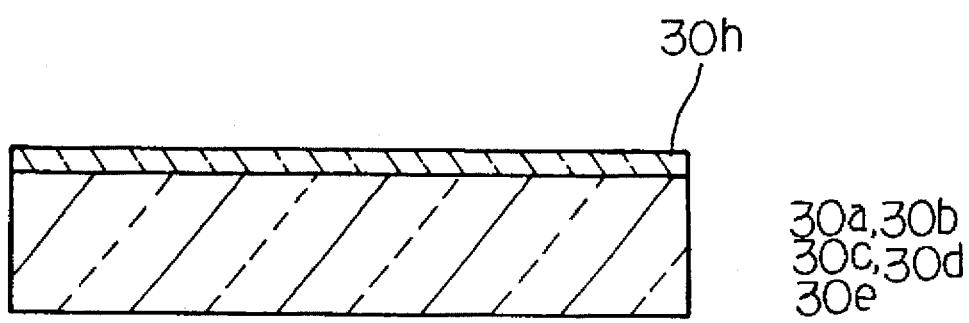

Subsequently, a photo-resist mask 39 is provided on the organic compound film 37, and covers surface areas for the stripe areas A or B as shown in FIG. 7C. The exposed surface areas are rubbed by the rubbing roller 38, and the rubbing roller is rotated and advances in the opposite directions as indicated by arrows 38c and 38d shown in FIG. 7D.

Finally, the photo-resist is removed in lactic acid ethyl, and the organic compound film 37.

The liquid crystal contains a small amount of chiral agent of the left turn, and The rubbing directions on the orientation films 30h and 31c and the chiral agent cause the liquid crystal molecules to turn from the surface of the orientation film 31c to the surface of the orientation film 30h in the counter-clock wise direction over 90 degrees. The liquid crystal molecules around the surfaces of the orientation films 30h and 31c are pre-tilted as indicated by the arrows 34a/34b and 35a/35b depending upon the direction of the orientation. Namely, the liquid crystal molecules are differently pre-tilted between the stripe areas A and B, and, accordingly, rise in the different directions under an electric field.

FIG. 6 shows the cross section vertical with respect to the extending direction of the gate bus line 30b, and dot-and-dash line is indicative of the boundary 36b between the stripe areas A and B. Short bars LC represent the liquid crystal molecules on both side of the boundary 36b, and pairs of arrows 40a and 40b show the rising motions of the liquid crystal molecules LC.

Figure 8:
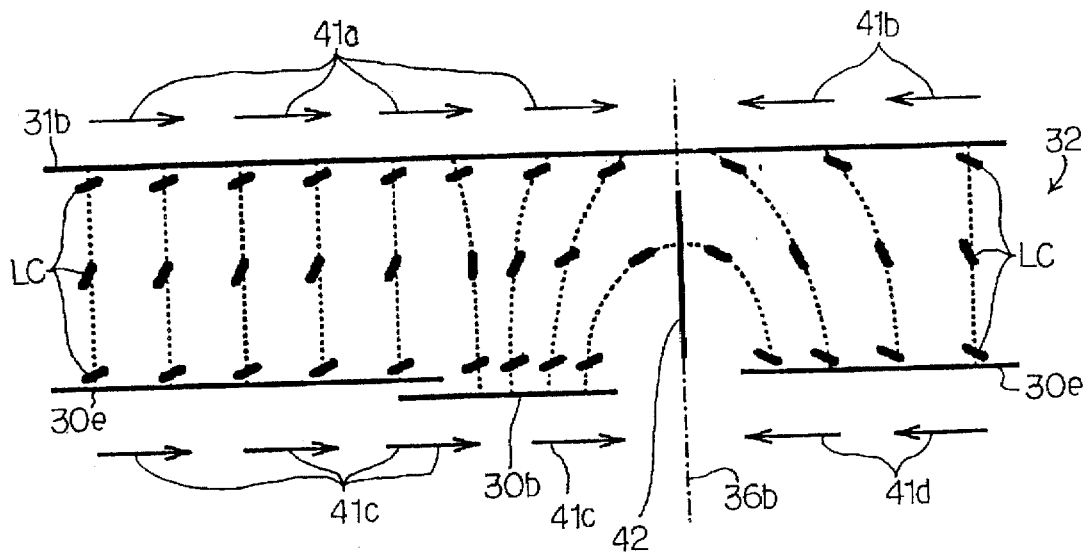
FIG. 8 is a view showing a disclination line produced in the liquid crystal of the liquid crystal display panel.

Subsequently, description is made of a disclination line produced in the liquid crystal 32 of the liquid crystal display panel with reference to FIG. 8. Arrows 41a/41b and 41c/41d are indicative of components of the rubbing directions on the orientation film 31c toward the cross section and components of the rubbing directions on the orientation film 30h toward the cross section.

When a potential was applied between the pixel electrodes 30e and the common electrode 31b, an electric field took place as indicated by dot lines, and affected the attitudes of the liquid crystal molecules LC.

As described hereinbefore, the boundary 36b extended between the gate bus line 30b and the pixel electrode 30e, and, accordingly, the electric lines of force in the electric field was matched with the directions of the pre-tilt around the boundary 36b. The lateral components of the electric lines did not adversely affect the liquid crystal molecules on both sides of the boundaries 36b. This resulted in was a disclination line 42 being fixed to a predetermined position between the pixel electrode 30e and the gate bus line 30b. The disclination line 42 did not project into open areas over the pixel electrodes 30e, and the liquid crystal display panel according to the present invention produced an image or images improved in picture quality. In other words, the image was improved in contrast ratio, and was free from a bright spot and a burnt/or after image.

Figure 9:
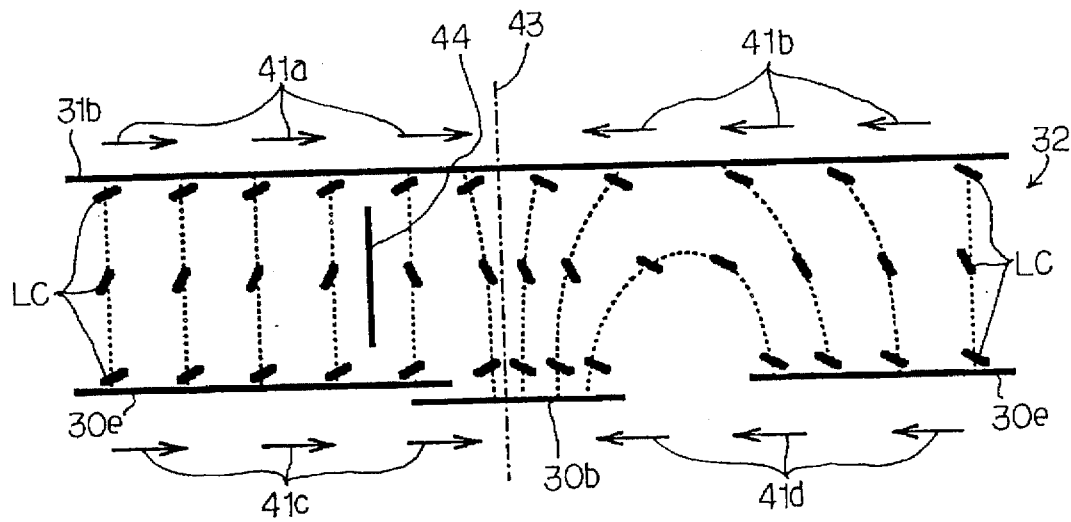
FIG. 9 is a view showing a disclination line produced in the liquid crystal of a comparative liquid crystal display panel.

The present inventors confirmed the improved picture quality in comparison with an image produced on a screen of a liquid crystal display panel out of the scope of the present invention. FIG. 9 illustrates the structure of a first comparative liquid crystal display panel, and the components are labeled with the same references as those of the liquid crystal display panel shown in FIG. 8.

As will be understood from the arrows 41a, 41b, 41c, 41d, boundaries 43 between the stripe areas A and B were aligned with the center lines of the gate bus line 30b, and extended along the gate bus lines. Other boundaries (not shown) extended across the pixel electrodes 30e in respective rows as similar to the boundaries 36a.

The electric lines of force in the electric field were not matched with the direction of the pre-tilt of the liquid crystal molecules around the boundary 43, and a disclination 44 unstably took place over the pixel electrode 30e. The disclination line 44 deteriorated the picture quality.

As will be understood from the foregoing description, the boundaries between the stripe areas A and B are positioned between the gate bus lines 30b and the pixel electrodes, and the electric lines of force in the electric field are matched with the directions of the pre-tilt around the boundaries. As a result, the disclination line 44 is fixed to the position between the gate bus lines 30b and the pixel electrodes 30e, and leakage current does not affect the image or images produced over the pixel electrodes 30e.

Second Embodiment

Figure 10:
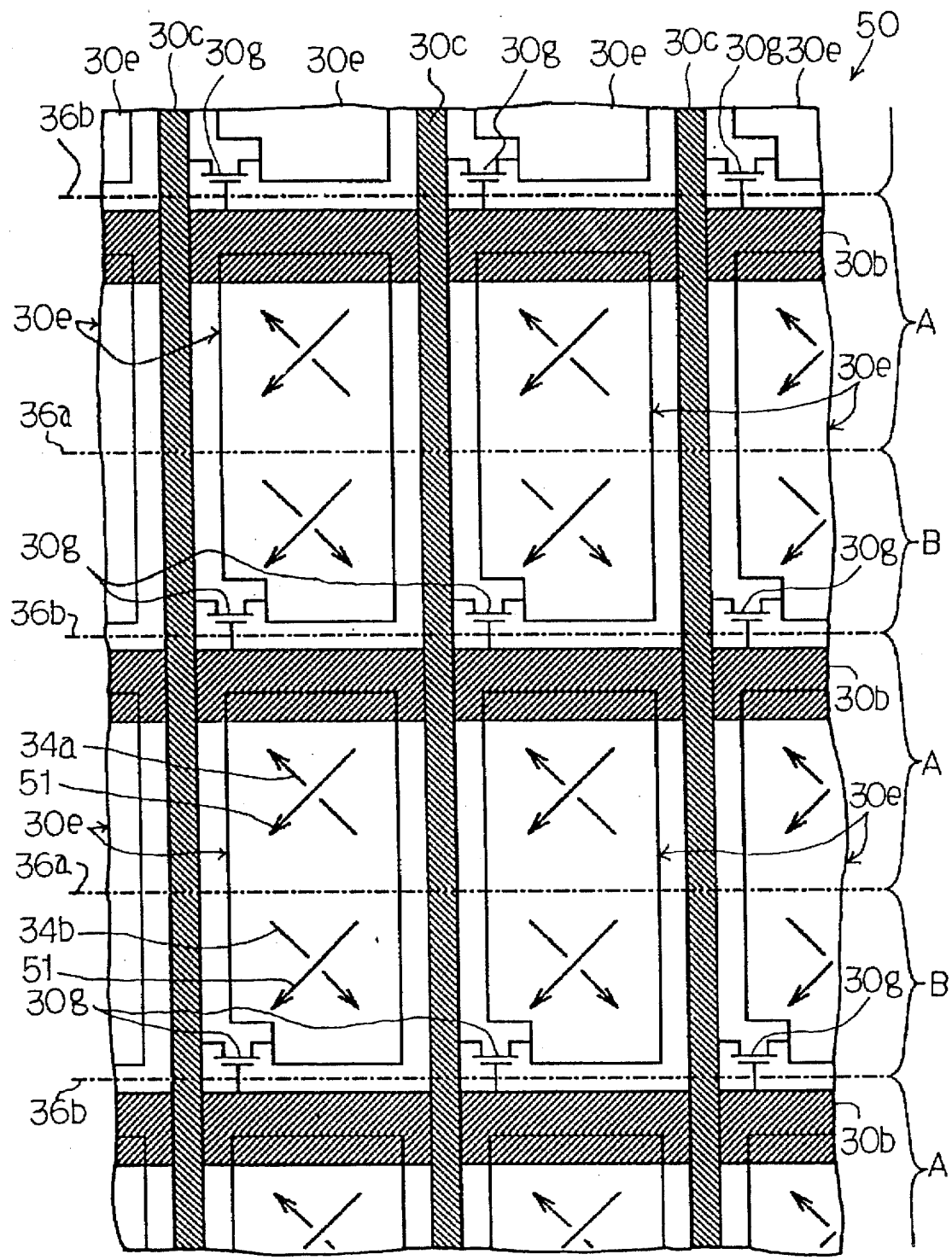
FIG. 10 is a plan view showing the layout of pixel electrodes, gate bus lines and drain bus lines incorporated in another liquid crystal display panel according to the present invention.

Turning to FIG. 10 of the drawings, another liquid crystal display panel embodying the present invention also comprises a first substrate structure 50, a second substrate structure spaced from the first substrate structure 50 and liquid crystal filling the gap between the first substrate structure 50 and the second substrate structure. FIG. 10 illustrates the liquid crystal display panel from the view point over the second substrate structure 31, and the first and second substrate structures of the second embodiment are similar to the first and second substrate structures 30 and 31 except for orientation films corresponding to the orientation films 30h and 31c. For this reason, the components of the second embodiment are labeled with the same references as those of the first embodiment without detailed description. The gate bus lines 30b and the drain bus lines 30c are hatched for the sake of easy discrimination thereof.

The orientation film of the first substrate structure 50 is formed of a substance which causes the liquid crystal to have a large pre-tilt angle. On the other hand, the orientation film of the second substrate structure is formed of a substance which causes the liquid crystal to have a small pre-tilt angle. The orientation film of the first substrate structure 50 is divided into the stripe areas A and B differently orientated as similar to the orientation film 30h of the first embodiment. However, the orientation film of the second substrate structure is not differently oriented, but is uniformly oriented over the entire surface in a direction indicated by arrows 51. A rubbing in one direction forms the uniformly oriented film, and the process for the second embodiment is rather simplified.

The boundaries 36b extend between the rows of pixel electrodes 30e and the gate bus lines 30b, and the other boundaries 36a are substantially aligned with the center lines of the lows of pixel electrodes 30e.

The orientation film for the high pre-tilt angle dominates the rising directions of the liquid crystal molecules, and achieves the liquid crystal molecular alignment similar to that of the first embodiment without the stripe areas A and B in the orientation film of the second substrate structure.

If the rubbing shown in FIGS. 7A to 7E differs the pre-tilt angle between the stripe areas A and B, the stripe areas with the larger pre-tilt angle should form what is called a spray arrangement. The arrangement achieves a stable liquid crystal molecular alignment. In this instance, SE-7210 manufactured by Nissan Chemical Corporation and AL-1051 manufactured by Nippon Synthetic Rubber Corporation are used for the substance for the large pre-tilt angle and the substance for the small pre-tilt angle.

The present inventors compared the liquid crystal display panel implementing the second embodiment with a second comparative liquid crystal display panel out of the scope of the present invention. The second comparative liquid crystal display panel was similar in structure to the liquid crystal display panel shown in FIG. 10 except for the boundaries between the stripe areas A and B. The boundaries 36b were not located between the gate bus lines 30b and the pixel electrodes 30e, but were aligned with the center lines of the gate bus lines 30b.

When a potential was applied, a disclination line unstably took place over the pixel electrodes 30e of the second comparative liquid crystal display panel as similar to the first comparative liquid crystal display panel. On the other hand, the liquid crystal display panel according to the present invention fixed the disclination line to the position between the gate bus line 30b and the pixel electrode 30e, and it did not project into the open area over the pixel electrodes 30e. The disclination line fixed between the gate bus line 30b and the pixel electrode 30e was also derived from the alignment between the electric lines of force in the electric field and the directions of pre-tilt. Thus, the present inventors confirmed the improvement in picture quality.

Third Embodiment

Figure 11:
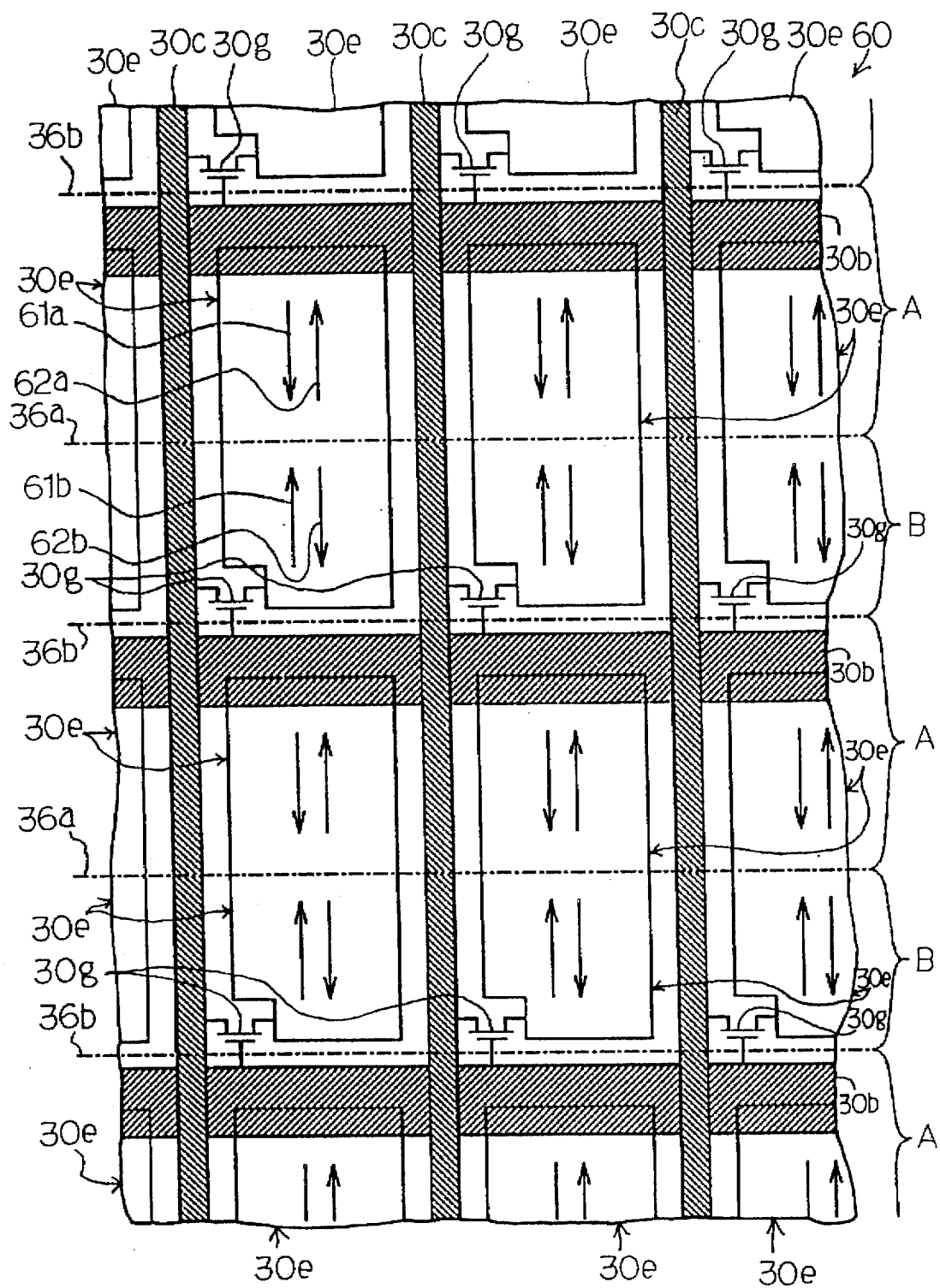
FIG. 11 is a plan view showing the layout of pixel electrodes, gate bus lines and drain bus lines incorporated in a homogeneous type liquid crystal display panel according to the present invention.

The present invention is effective against a disclination line produced in the homogeneous type liquid crystal display panel, and FIG. 11 illustrates the homogeneous type liquid crystal display panel embodying the present invention. The homogeneous type liquid crystal display panel also comprises a first substrate structure 60, a second substrate structure and liquid crystal filling a gap between the first substrate structure 60 and the second substrate structure. FIG. 11 illustrates the homogeneous type liquid crystal display panel from the view point over the second substrate structure, and the first and second substrate structure of the second embodiment are similar to the first and second substrate structures 30 and 31 except for orientation films corresponding to the orientation films 30h and 31c. For this reason, the components of the third embodiment are labeled with the same references as those of the first embodiment without detailed description. The gate bus lines 30b and the drain bus lines 30c are hatched for the sake of easy discrimination thereof.

The orientation film of the first substrate structure 60 is divided into stripe areas A and B, and the direction of the orientation is opposite between the stripe areas A and the stripe areas B as indicated by arrows 61a and 61b. The orientation film of the second substrate structure is also divided into stripe areas A and B, and the directions of the orientation are respectively opposite to the directions of the orientation of the orientation film of the first substrate structure 60 as indicated by arrows 62a and 62b.

The boundaries 36a and 36b are located as similar to those of the first embodiment. The boundaries 36a extend in parallel to the gate bus lines 30b, and pass through the center lines of the pixel electrodes 30e of the respective rows. On the other hand, the boundaries 36b extend between the rows of pixel electrodes 30e and the gate bus lines 30b respectively coupled to the associated rows of pixel electrodes 30e. If the orientation films are respectively formed of a substance for a large pre-tilt angle and another substance for a small pre-tilt angle, the stripe areas A and B are formed in the orientation film of the first substrate structure only, and the process is simplified as similar to the second embodiment.

The liquid crystal does not contain a chiral agent, and the liquid crystal molecules are aligned with the directions of orientation in parallel to the surfaces of the orientation films. The liquid crystal molecules around the surfaces of the orientation films are pre-tilted toward the arrowheads of the arrows 61a/61b and 62a/62b. Therefore, the liquid crystal molecules are differently pre-tilted between the stripe areas A and B around the surfaces of the orientation films, and rise differently under an electric field.

The present inventors confirmed the position of a disclination line produced in the liquid crystal of the homogeneous type liquid crystal display panel. A third comparative homogeneous type liquid crystal display panel was also fabricated as similar to the third embodiment except for the boundaries 36b. The boundaries 36b of the third comparative homogeneous type liquid crystal display panel were aligned with the center lines of the gate bus lines 30b as similar to the first comparative liquid crystal panel.

The boundaries 36b of the homogeneous type liquid crystal display panel according to the present invention caused the liquid crystal to fixedly produce the disclination line between the gate bus lines 30b and the pixel electrodes 30e by virtue of the alignment of the electric lines of force in the electric field and the directions of pre-tilt on both sides of the boundary 36b. On the other hand, the third comparative homogeneous liquid crystal display panel caused the disclination line to unstably project into the open areas over the pixel electrodes 30e due to the electric lines of force misaligned with the directions of pre-tilt of the liquid crystal molecules on both sides of the boundary 36b.

Therefore, the disclination line does not deteriorate the picture quality of the homogeneous type liquid crystal display panel according to the present invention.

Fourth Embodiment

Figure 12:
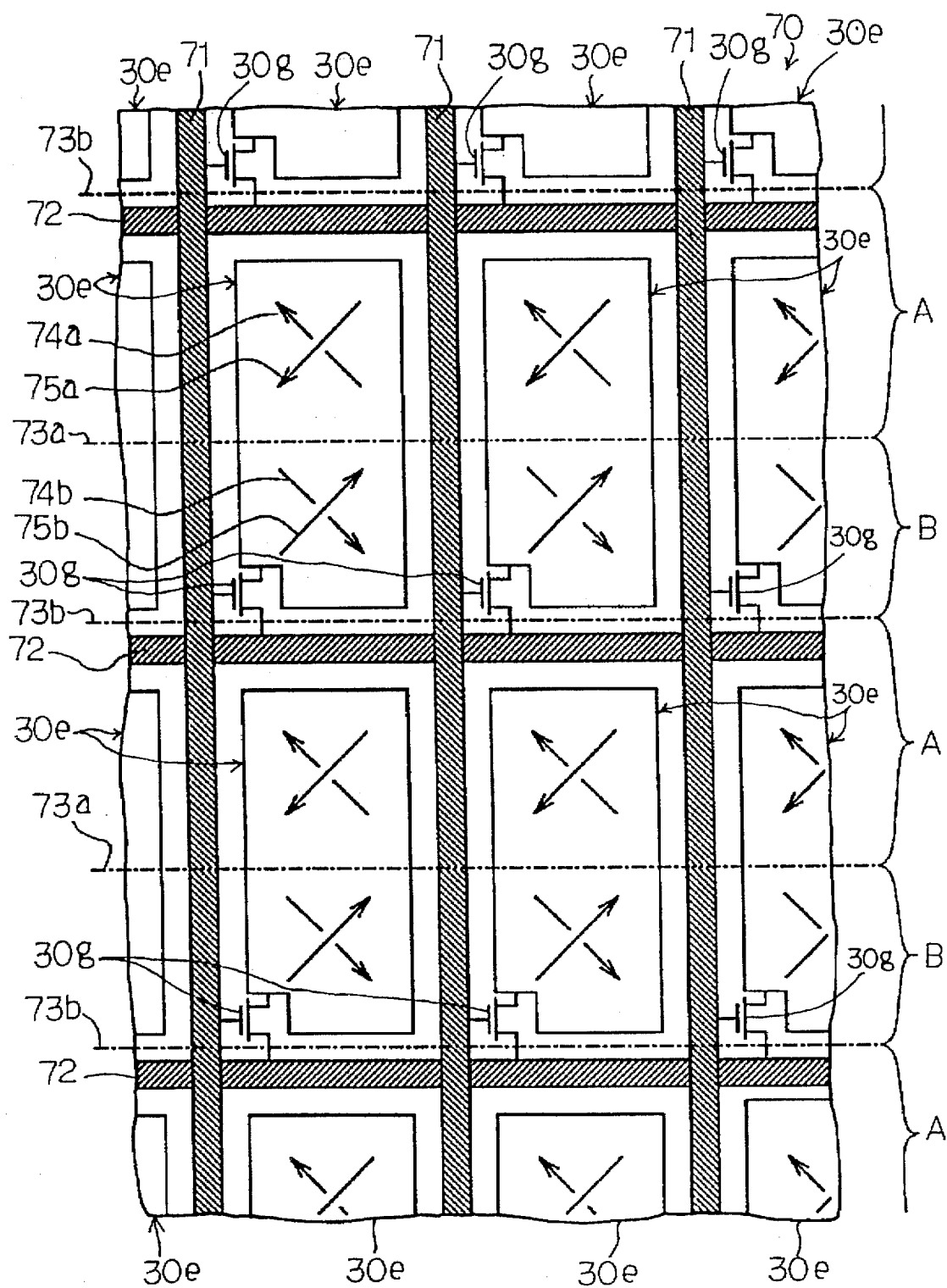
FIG. 12 is a plan view showing the layout of pixel electrodes, gate bus lines and drain bus lines incorporated in yet another liquid crystal display panel according to the present invention.

Turning to FIG. 12 of the drawings, yet another liquid crystal display panel embodying the present invention also comprises a first substrate structure 70, a second substrate structure and liquid crystal filling a gap between the first substrate structure and the second substrate structure. FIG. 12 illustrates the liquid crystal display panel from a view point over the second substrate structure. The second substrate structure and the liquid crystal are similar to those of the first embodiment.

Gate bus lines 71 are exchanged with drain bus lines 72, and control the switching transistors 30g coupled between the drain bus lines 72 and the pixel electrodes 30e. The gate bus lines 71 and the drain bus lines 72 are hatched so as to easily discriminate them from other components. The gate bus lines 71 are not overlapped with the pixel electrodes 30e, and gate storage is not formed therebetween.

The orientation film of the first substrate structure 70 and the orientation film of the second substrate structure are divided into stripe areas A and B. The boundaries 73a extend in parallel to the drain bus lines 72, and are aligned with the center lines of the rows of pixel electrodes 30e. On the other hand, the boundaries 73b extend between the rows of pixel electrodes 30e and the drain bus lines 72 in parallel to the drain bus lines 72.

The orientation film of the first substrate structure 70 is differently oriented between the stripe areas A and B, and the directions of orientation are labeled with references 74a and 74b. References 75a and 75b are indicative of the directions of orientation in the stripe areas A and B on the orientation film of the second substrate structure.

The liquid crystal molecules on both sides of each boundary 73b have respective major axes each declining as similar to those of the liquid crystal molecules LC shown in FIG. 6.

The present inventors confirmed that a disclination line stably took place in the liquid crystal between the drain bus lines 72 and the pixel electrodes. The disclination line did not project into the open areas over the pixel electrodes 30e, and the liquid crystal display panel implementing the fourth embodiment improved the picture quality.

Fifth Embodiment

Figure 13:
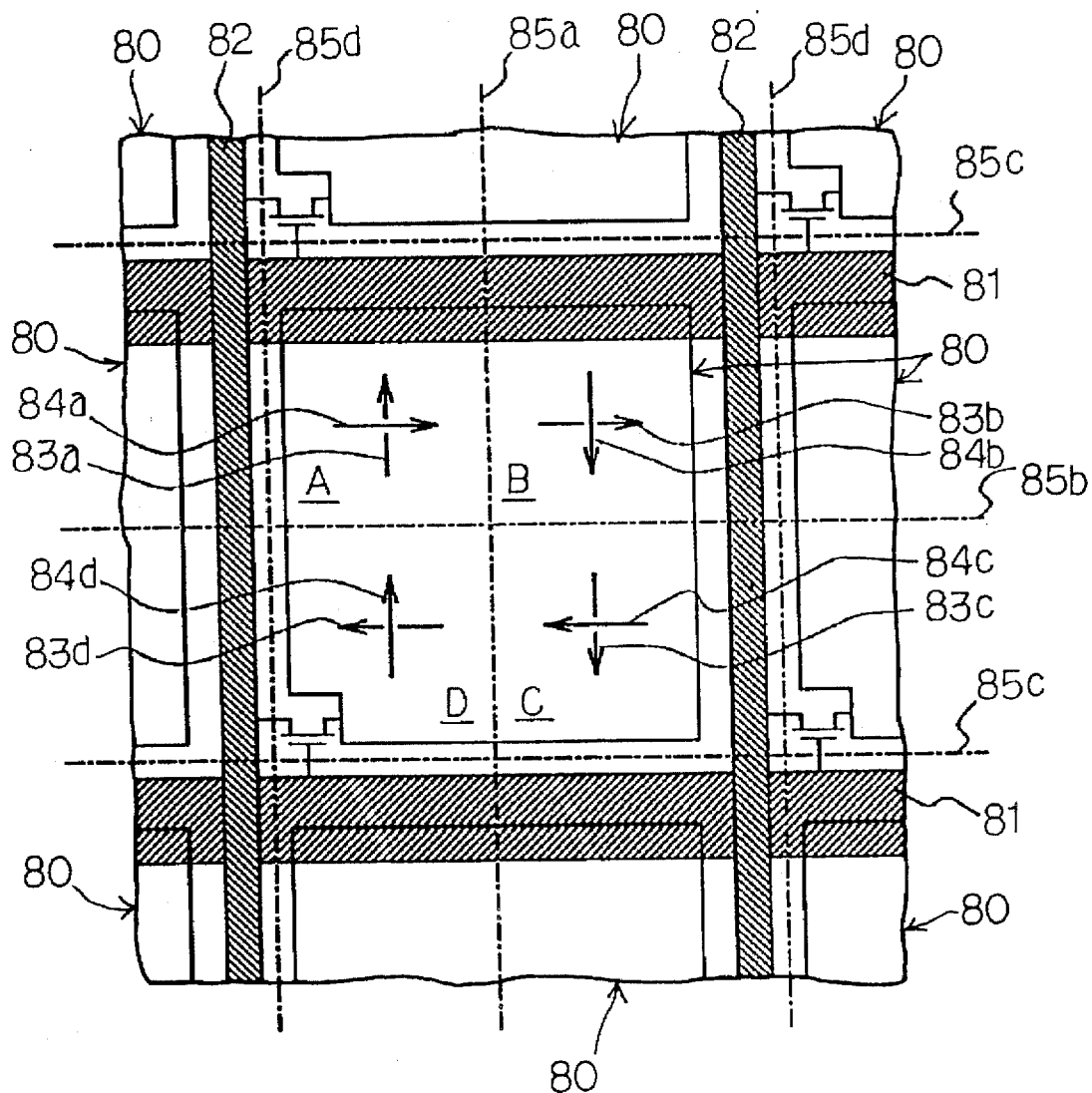
FIG. 13 is a plan view showing a pixel incorporated in still another liquid crystal display panel according to the present invention.

FIG. 13 illustrates pixel electrodes 80 arranged in matrix and surrounded by gate bus lines 81 and drain bus lines 82. The pixel electrodes 80 are formed in a first substrate structure, and the first substrate structure forms a liquid crystal display panel together with a second substrate structure and liquid crystal filling a gap between the first and second substrate structures. FIG. 13 illustrates the liquid crystal display panel from a view point over the second substrate structure. The second substrate structure and the liquid crystal are similar to those of the first embodiment, and the gate bus lines 81 and the drain bus lines 82 are hatched so as to easily discriminate them from other components.

The first substrate structure and the second substrate structure have respective orientation films, and the orientation films contain respective rectangular areas overlapped with each pixel electrode 80. The rectangular area of the first orientation film is divided into four sub-areas A, B, C, and D, and references 83a, 83b, 83c and 83d are indicative of directions of orientation of the four sub-areas A, B, C, and D in the orientation film of the first substrate structure. Similarly, references 84a, 84b, 84c and 84d designate directions of orientation of the four sub-areas A, B, C and D in the orientation film of the second substrate structure, respectively.

Boundaries 85a, 85b, 85c and 85d take place among the sub-areas A, B, C and D. Each boundary 85a is aligned with first center lines of the pixel electrodes 80, and extends in parallel to the drain bus lines 82. The boundary 85b is aligned with second center lines of the pixel electrodes 80 perpendicular to the first center lines, and extends in parallel to the gate bus lines 81. Each of the boundaries 85c extends between one of the gate bus lines 81 and the pixel electrodes 80 associated with the gate bus line 81 in parallel to the gate bus lines 81, and each of the boundaries 85d extends between each of the drain bus lines 82 and the pixel electrodes associated with the drain bus line.

The liquid crystal molecules on both sides of each boundary 85c or 85d have respective major axes each declining as similar to the liquid crystal molecules LC shown in FIG. 6 under an electric field.

The present inventors confirmed that disclination lines stably took place between the pixel electrodes 80 and the gate bus lines 81 and between the pixel electrodes 80 and the drain bus lines 82. The disclination lines did not project into the open areas over the pixel electrodes 80, and the liquid crystal display panel improved the picture quality.

As will be appreciated from the foregoing description, the disclination line does not project into the open areas over the pixel electrodes by virtue of the alignment between the electric lines of force in the electric field and the directions of pre-tilt of the liquid crystal molecules on both sides of the boundary between the pixel electrodes and the gate/drain bus lines, and the liquid crystal display panel improves the picture quality.

Sixth Embodiment

Figure 14:
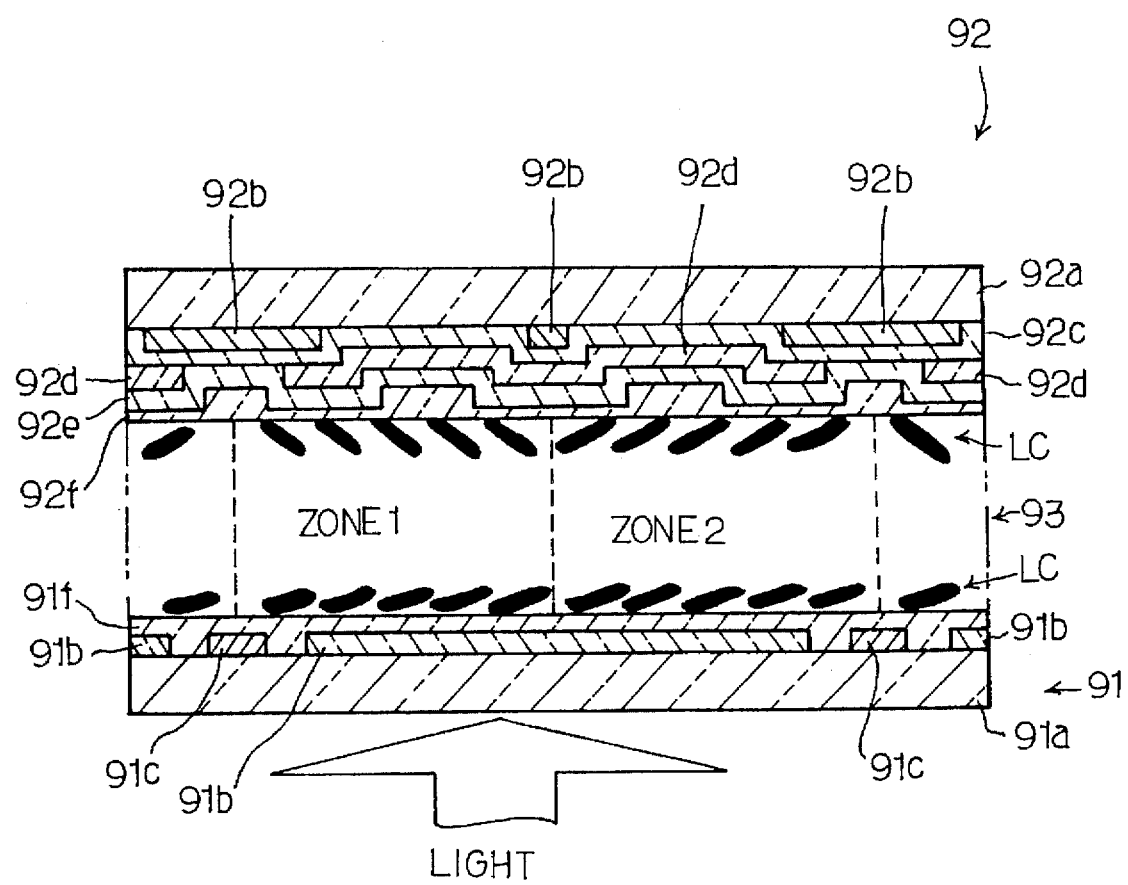
FIG. 14 is a cross sectional view showing the structure of a liquid crystal display panel according to the present invention.

Turning to FIG. 14 of the drawings, a liquid crystal display panel embodying the present invention largely comprises a first substrate structure 91, a second substrate structure 92 spaced from the first substrate structure 91 and liquid crystal filling the gap between the first substrate structure 91 and the second substrate structure 92.

Figure 15:
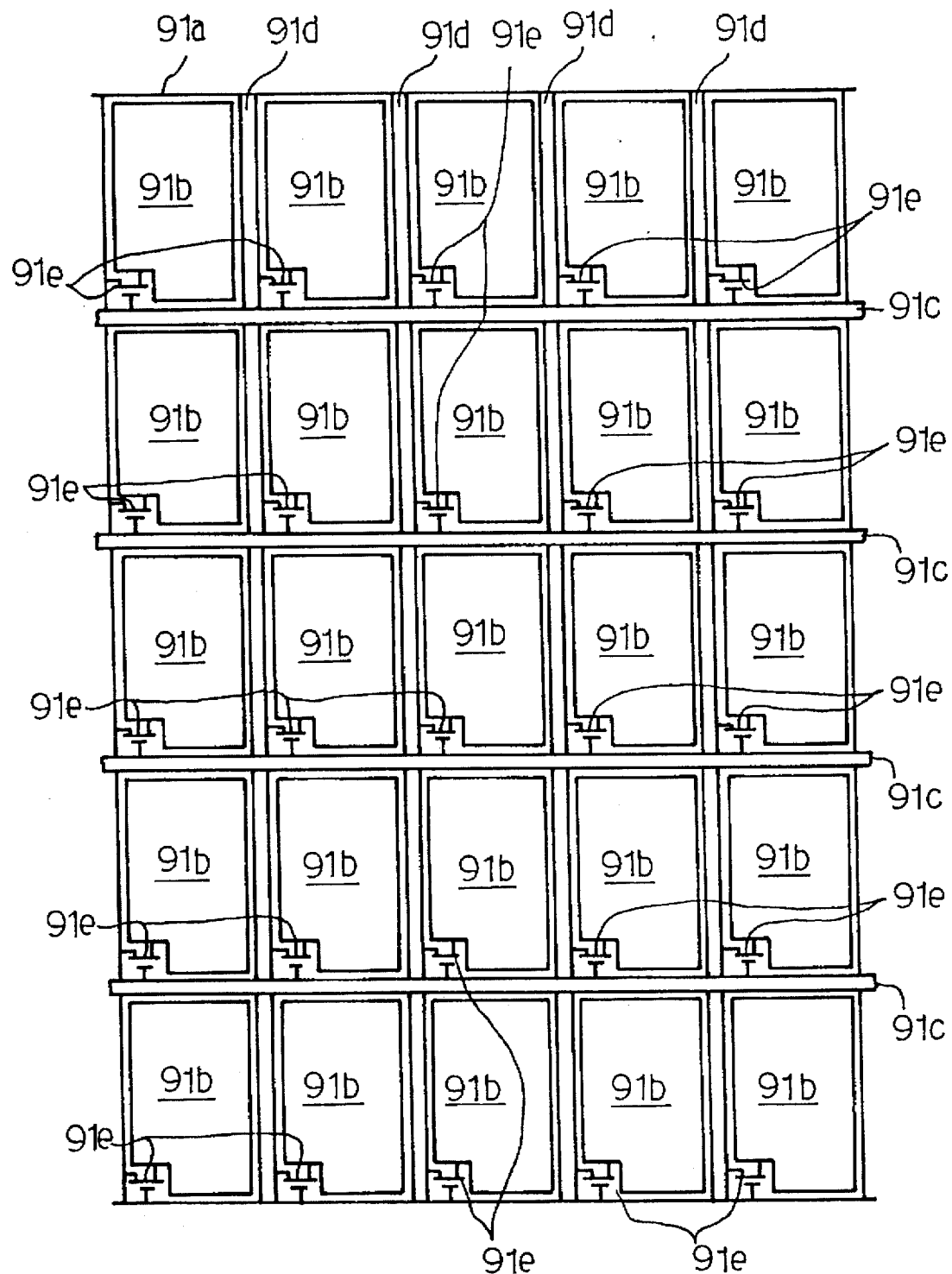
FIG. 15 is a plan view showing the layout of pixel electrodes and bus lines on a transparent substrate incorporated in the liquid crystal display panel.

The first substrate structure 91 includes a transparent substrate 91a of glass, and pixel electrodes 91b are arranged in rows and columns on the transparent substrate 91a as shown in FIG. 15. The rows of pixel electrodes 91b are spaced apart from one another, and gaps take place between every two columns of pixel electrodes 91b. The pixel electrodes 91b are formed of indium tin oxide (ITO) patterned from an indium tin oxide film sputtered on the transparent substrate 91a, and are, accordingly, transparent. Each of the pixel electrodes 91b has a generally rectangular configuration, and occupies an area of 261 microns by 108 microns.

The first substrate structure 91 further includes a plurality of gate bus lines 91c each extending between two rows of pixel electrodes 91b, a plurality of drain bus lines 91d each extending between two columns of pixel electrodes 91b and a plurality of thin film transistors 91e respectively associated with the pixel electrodes 91b. The gate bus lines 91c and the drain bus lines 91d are formed from sputtered chromium films, and are 18 microns in width. The thin film transistors 91e are formed in amorphous silicon layers, and the gate insulating layers are formed of silicon nitride.

In this instance, the gate bus lines 91c extend in the direction of a row. However, the gate bus lines 91c and the drain bus lines 91d are exchangeable, and, accordingly, the gate bus lines 91c and the drain bus lines 91d may extend in the direction of a column and the direction of a row, respectively.

The first substrate structure 91 further includes an orientation layer 91f of polyimide. In this instance, the polyimide for the orientation layer 91f is AL-1051 manufactuerd by Nippon Synthetic Rubber Corporation, and gives small pre-tilt angle to the liquid crystal molecles LC as indicated by short bars in FIG. 14.

The orientation layer 91f is formed as follows. The polyimide of AL-1051 is spun onto the the pixel electrodes patterned over the transparent substrate 91a, and the polyimide film is baked at 200 degrees centigrade for an hour, and the baked polyimide layer is subjected to a rubbing.

The second substrate structure 92 includes a transparent substrate 92a, shading members 92b fromed from a chromium film sputtered on the transparent substrate 92a and a transparent common electrode 92c of indium tin oxide. The transparent common electrode 92c covers the shading members 92b and the exposed surface of the transparent substrate 92a.

The second substrate sructure 92 further includes color filters 92d arranged in matrix over the pixel electrodes 91e and a protection layer 92e covering the color filters 92d and the exposed surface of the transparent common electrode 92c. The color filters 92d are appropriately colored by using a dyeing process, and the protection layer 92e is formed of silica.

The second substrate structure 92 further includes an orientation layer 92f of polyimide covering the protection layer 92e. The polyimide for the orientation layer 92f is LC-102 manufacturered by Hitachi Chemical Industry Corporation, and gives a large pre-tilt angle to the liquid crystal molecules as shown in FIG. 14. The orientation layer 92f is divided into a plurality of stripe areas alternately oriented in opposite directions, and two adjacent stripe areas differently pre-tilt the liquid crystal molecules so as to form zones 1 and 2 over each pixel electrode 91b.

Figure 1:
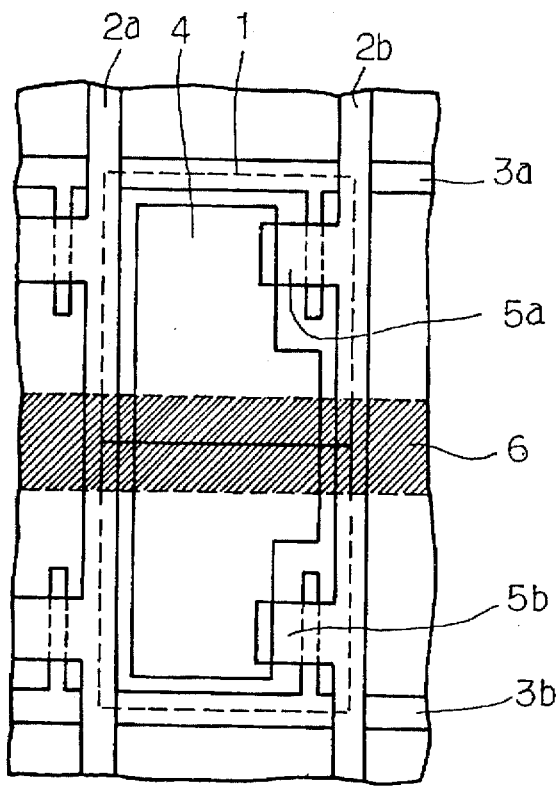
FIG. 1 is a plan view showing the layout of the prior art liquid crystal display panel.
Figure 2:
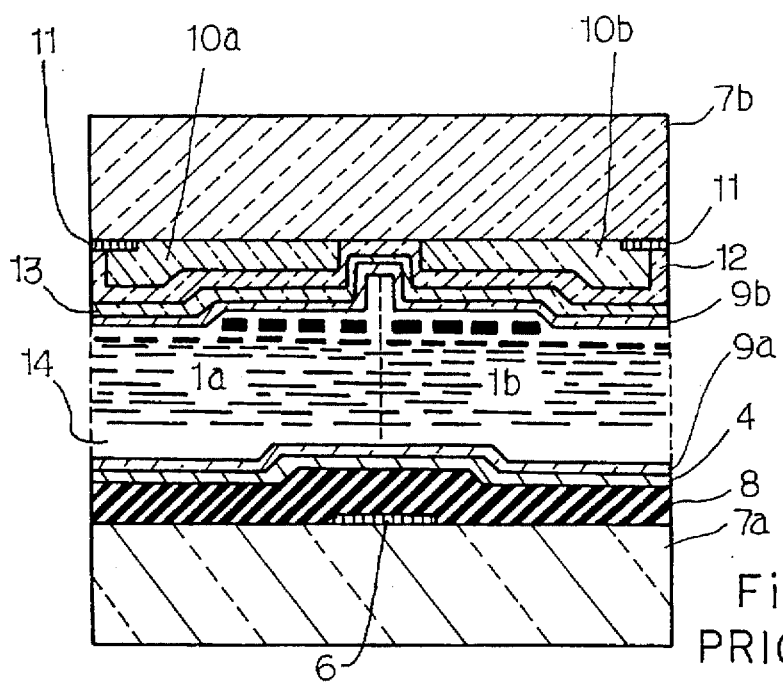
FIG. 2 is a cross sectional view showing the structure of the prior art liquid crystal display panel.
Figure 3:
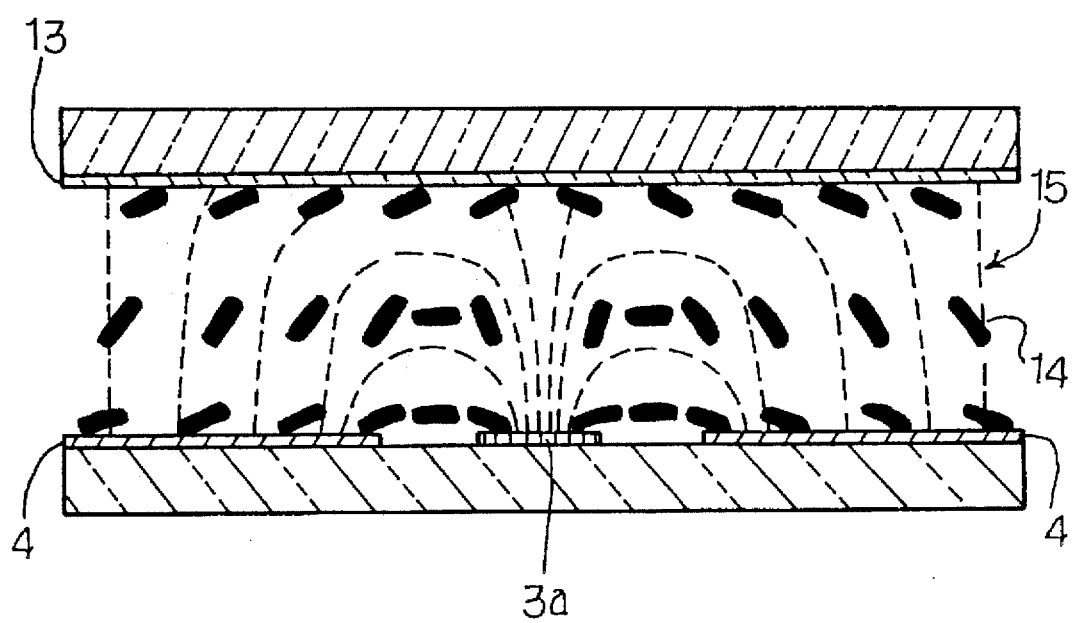
FIG. 3 is a schematic view showing the function of the prior art liquid crystal display panel.
Figure 4A:
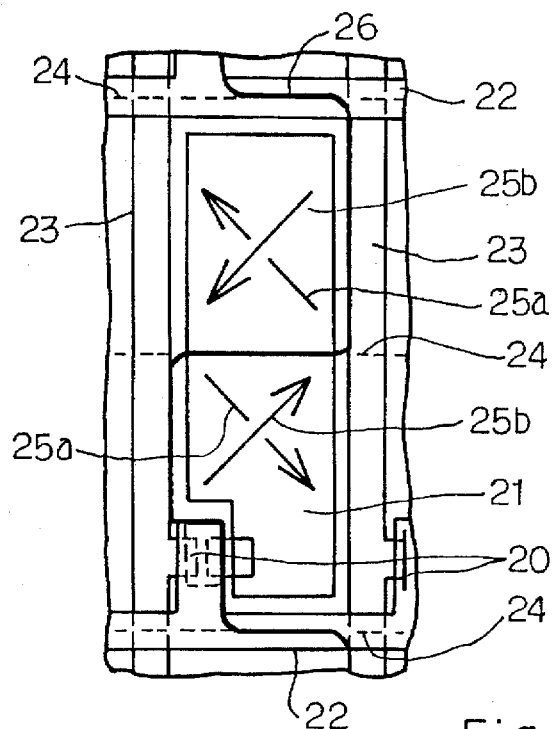
FIGS. 4A and 4B are plan views showing the disclination lines produced on the prior art liquid crystal display panel.
Figure 4B:
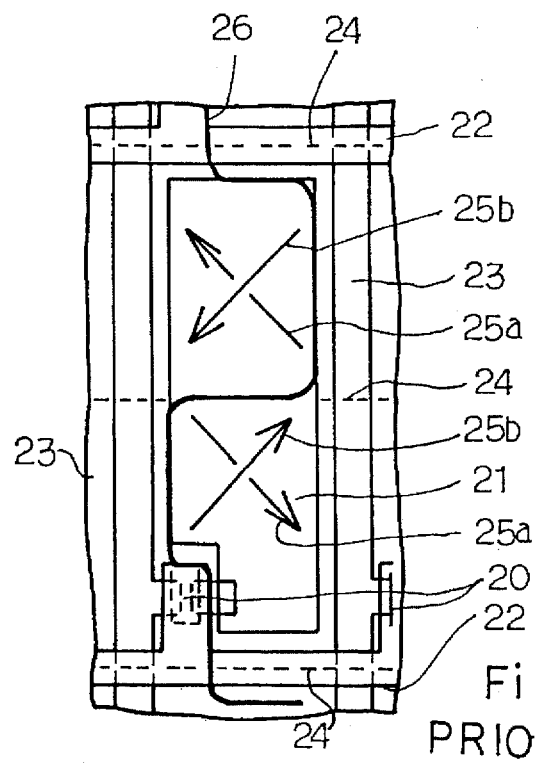

The orientation layer 92f is formed as follows. After the coating stage of the polyimide, the polyimide film is baked at 250 degrees centigrade for an hour. The baked polyimide layer is subjected to a rubbing in one direction over the entire surface thereof. A photo-resist layer is provided over the entire surface of the polyimide layer, and is patterned into a stripe-shaped photo-resist mask through lithographic techniques. The photo-resist mask has stripe portions at intervals, and the stripe portions and the open areas therebetween are 126 microns in width and 135 microns in width, respectively. Each of the pixel electrodes 91b is partially covered with the stripe portion and partially exposed to the open area. The polyimide layer exposed to the open areas is subjected to a rubbing different at 180 degrees from the previous rubbing. After the rubbing, the photo-resist mask is removed from the polyimide layer, and the orientation layer 92f is formed from the polyimide layer by using the rubbing twice. The directions of rubbing on the orientation layer 92f are identical with those labeled with 25b in FIGS. 4A and 4B, and the direction of rubbing on the orientation layer 91f is twisted by 90 degrees with respect to the directions of orientation on the orientation layer 92f.

The first substrate structure 9 is opposed to the second substrate structure 92 such that the orientation layer 91f is spaced from the orientation layer 92f by 5.5 microns, and spacers (not shown) of silica balls are inserted between the first substrate structure 91 and the second substrate structure 92. The first substrate structure 91 is bonded through the spacers to the second substrate structure 92, and the liquid crystal 93 is injected into the gap. The liquid crystal 93 is the standard nematic type with positive dielectric anisotropy, and contains a chiral agent of the left turn type.

The present inventors measured the pre-tilt angles in the zones 1 and 2 as follows.

First, a polyimide layer of LC-102 was subjected to the rubbing in the one direction, and the photo-resist was spread over the entire surface. The photo-resist layer was perfectly covered with a mask, and the mask was exposed to light. When the photo-resist layer was developed, the photo-resist layer remained on the entire surface of the polyimide layer. The photo-resist layer over the polyimide layer was subjected to the second rubbing, and the photo-resist was removed. This was the first sample.

Similarly, another polyimide layer of LC-102 was subjected to the rubbing in the one direction, and the photo-resist was spread over the entire surface. The photo-resist layer was perfectly covered with a mask, and was exposed to light. When the photo-resist layer was developed, the photo-resist layer was perfectly removed from the entire surface of the polyimide layer. The polyimide layer was subjected to the second rubbing. This was the second sample. Thus, two kinds of anti-parallel sample were prepared, and the pre-tilt angles were measured through a crystal rotation method. The pre-tilt angle for the first sample was 3.4 degrees, and the pre-tilt angle for the second sample was 2.7 degrees.

Similarly, a third sample was prepared by using the polyimide of AL-1051, and the pre-tilt angle was measured through the crystal rotation method. The pre-tilt angle was 1.4 degrees.

The present inventors evaluated the liquid crystal display panel. When images were produced over the pixels, a burnt image and a bright spot were not observed. When reflection light was incident on either first or second transparent substrate 91a or 92a, a disclination line was hidden under the shading members 92b. When the lateral components of the electric lines of force were increased, the disclination line did not project into the open areas over the pixel electrodes 91b, and the present inventor confirmed the improvement in picture quality.

As will be appreciated from the foregoing description, the orientation layer 92f causes the liquid crystal molecules thereon to have a larger pre-tilt angle than the liquid crystal molecules on the orientation layer 91f according to the present invention, and these orientation layers 91f and 92f confine the disclination line under the shading members 92b. As a result, the liquid crystal display panel having the orientation layers 91f and 92f is improved in picture quality.

Seventh Embodiment

Another liquid crystal display panel embodying the present invention is fabricated as similar to the sixth embodiment except for the polyimide for the large pre-tilt angle. The orientation layer 92f for the large pre-tilt angle is formed from a polyimide layer RN-715 manufactured by Nissan Chemical Corporation.

The present inventors measured the pre-tilt angles by using the similar process to the sixth embodiment. The pre-tilt angle under the stripe area subjected to the second rubbing through the photo-resist layer was 12 degrees, and the pre-tilt angle under the other stripe area directly subjected to the rubbing twice was 9 degrees.

The orientation layer 92f of the seveth embodiment achieved stable orientation by virtue of the larger pre-tilt angle, and the present inventors confirmed the improvement in picture quality. In other words, the liquid crystal display panel implementing the seventh embodiemnt did not produce a bright spot, and a disclination line was hidden under the shading members 92b without a projection into the open areas over the pixel electrodes 91b.

Eighth Embodiment

Yet another liquid crystal display panel emboying the present invention is fabricated as similar to the sixth embodiment except for the polyimide for the large pre-tilt angle. The orientation layer 92f for the large pre-tilt angle is formed from a polyimide layer K-106 manufacturered by Toray Corporation, and the polyimide layer is baked at 200 degrees centigrade.

The present inventors measured the pre-tilt angles by using the similar process to a sixth embodiment. The pre-tilt angle under the stripe area subjected to the second rubbing through the photo-resist layer was 16 degrees, and the pre-tilt angle under the other stripe area directly subjected to the rubbing twice was 9 degrees.

The orientation layer 92f of the eighth embodiment achieved stable orientation by virtue of the larger pre-tilt angle, and the present inventors confirmed the improvement in picture quality. In other words, the liquid crystal display panel implementing the seventh embodiment did not produce a bright spot, and a disclination line was hidden under the shading members 92b without a projection into the open areas over the pixel electrodes 91b.

Ninth Embodiment

Figure 16:
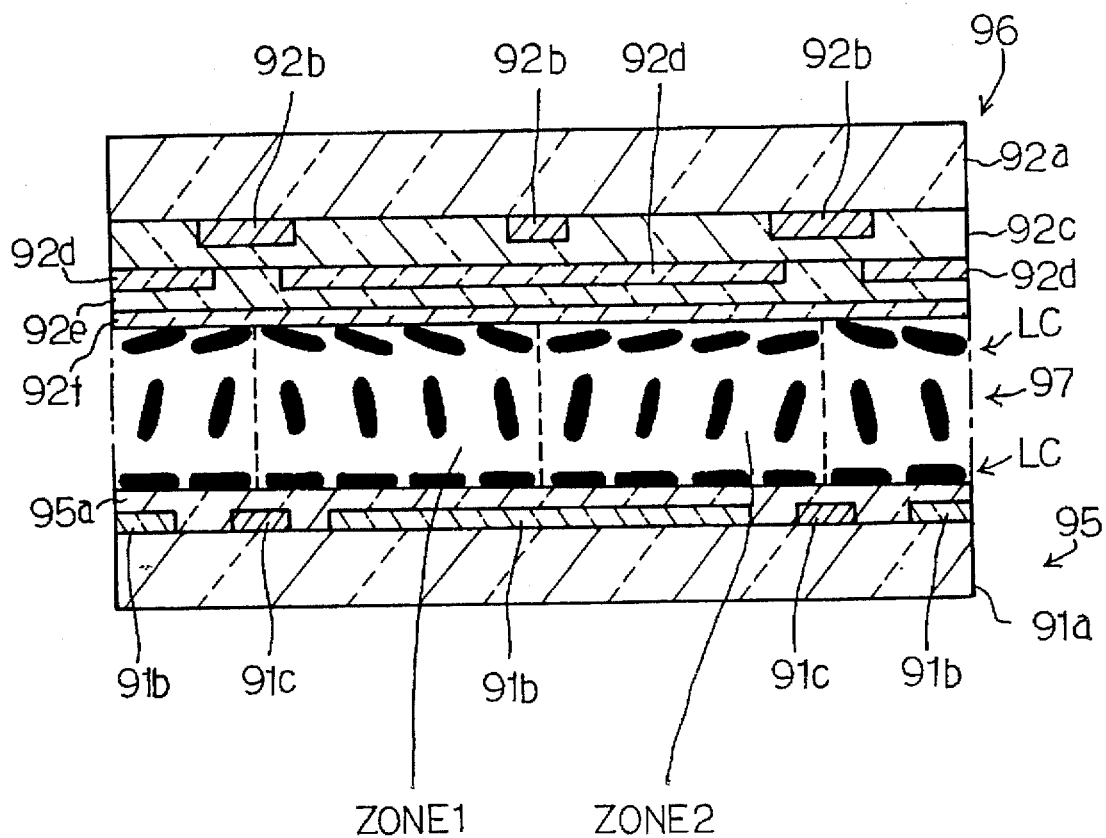
FIG. 16 is a cross sectional view showing the structure of another liquid crystal display panel according to the present invention.

Turning to FIG. 16 of the drawings, yet another liquid crystal display panel embodying the present invention largely comprises a first substrate structure 95, a second substrate structure 96 spaced from the first substrate structure 95 and liquid crystal filling a gap between the first substrate structure 95 and the second substrate structure 96.

The second substrate structure 96 and the liquid crystal 97 are similar to those of the sixth embodiment, and, for this reason, the components of the second substrate structure 96 are labeled with the same references designating corresponding parts and layers of the second substrate structure 92 without detailed description.

The first substrate structure 95 is similar to the first substrate structure 92 except for an orientation layer 95a, and other components of the first substrate structure 95 are labeled with the same references designating corresponding parts and layers of the first substrate structure 91 without detailed description.

The orientation layer 95a for the small pre-tilt angle is formed of polyimide SE-1180 manufactured by Nissan Chemical Corporation.

The present inventors measured the pre-tilt angle on the orientation layer 95a as similar to the sixth embodiment. The crystal rotation method showed that the pre-tilt angle was 0.8 degree, and the present inventors confirmed that the liquid crystal display panel was free from a burnt image and a bright spot.

Figure 17:
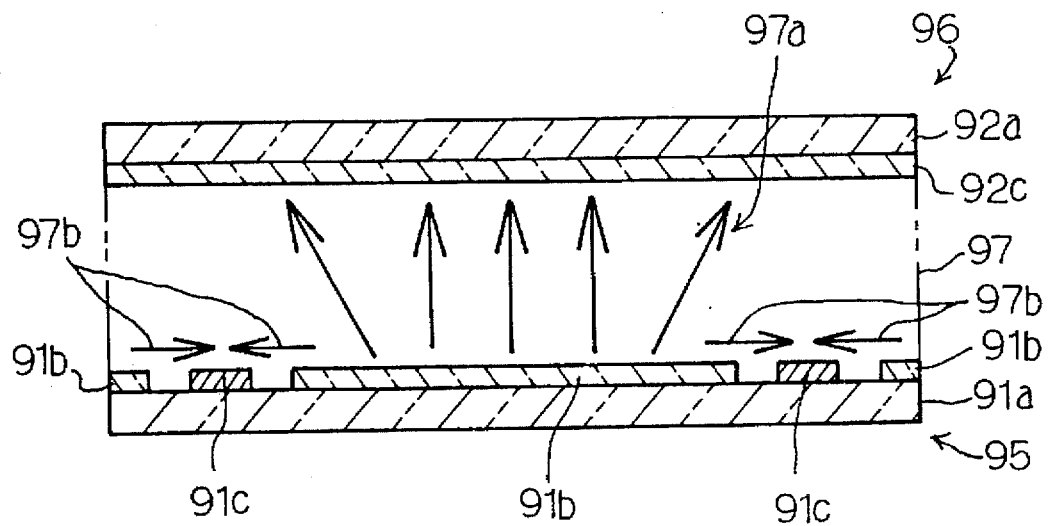
FIG. 17 is a schematic view showing an electric field across a liquid crystal layer.
Figure 18:
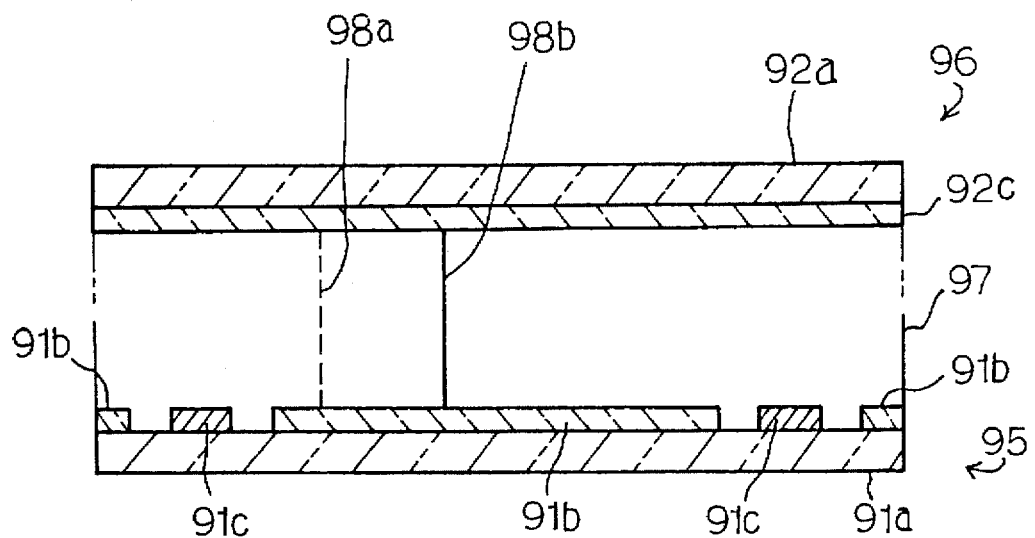
FIG. 18 is a schematic view showing disclination lines produced under different pre-tilt angles.

When a potential is applied between the pixel electrode 91b and the transparent common electrode 92c, an electric field takes place across the liquid crystal layer 97, and representative electric lines of force are indicated by arrows 97a in FIG. 17, and the gate bus lines 91c and the drain bus lines 91d further create electric field and lines force of which are represented by arrows 97b.

If the pre-tilt angle of the liquid crystal molecules on the orientation layer 92f is small, the disclination line is moved from a peripheral position 98a to a central position 98b over the pixel electrode 91b. On the other hand, if the pre-tilt angle is large, the disclination line takes place over the peripheral area of the pixel electrode 91b.

The present inventors observed the projection of the disclination line, and the relation between the pre-tilt angle of the liquid crystal molecules on the orientation layer 92f and the position of the disclination line. In the case where the pre-tilt angle was lower than 1.5 degrees, the disclination line projected from the outer periphery of the pixel electrode into 10 percent of the width of the pixel electrode 91b. If the pre-tilt angle was lower than 1.0 degrees, the projection length was increased to 30 percent of the width of the pixel electrode 91b. Thus, the large pre-tilt angle is preferable.

The stripe areas differently oriented compensated for a small pre-tilt angle of the liquid crystal molecules on the orientation layer 92f.

The present inventors further studied the pre-tilt angle of the liquid crystal molecules on the orientation layer 91f, and concluded that a pre-tilt angle equal to or less than 1.5 degrees was effective against the disclination line. If the pre-tilt angle was equal to or less than 1.0 degrees, the disclination line was perfectly confined in the liquid crystal under the shading members 92b.

Tenth Embodiment

Figure 19:
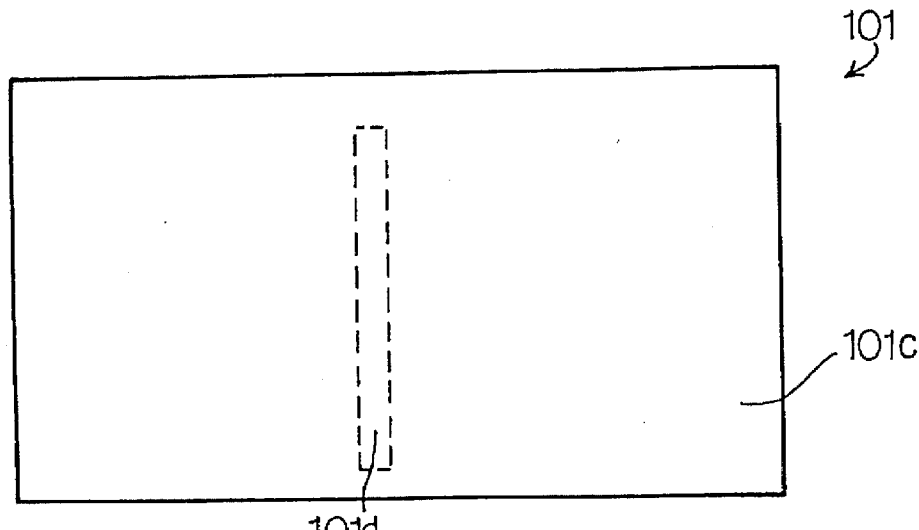
FIG. 19 is a bottom view showing a second substrate structure incorporated in a liquid crystal display panel according to the present invention.
Figure 20:
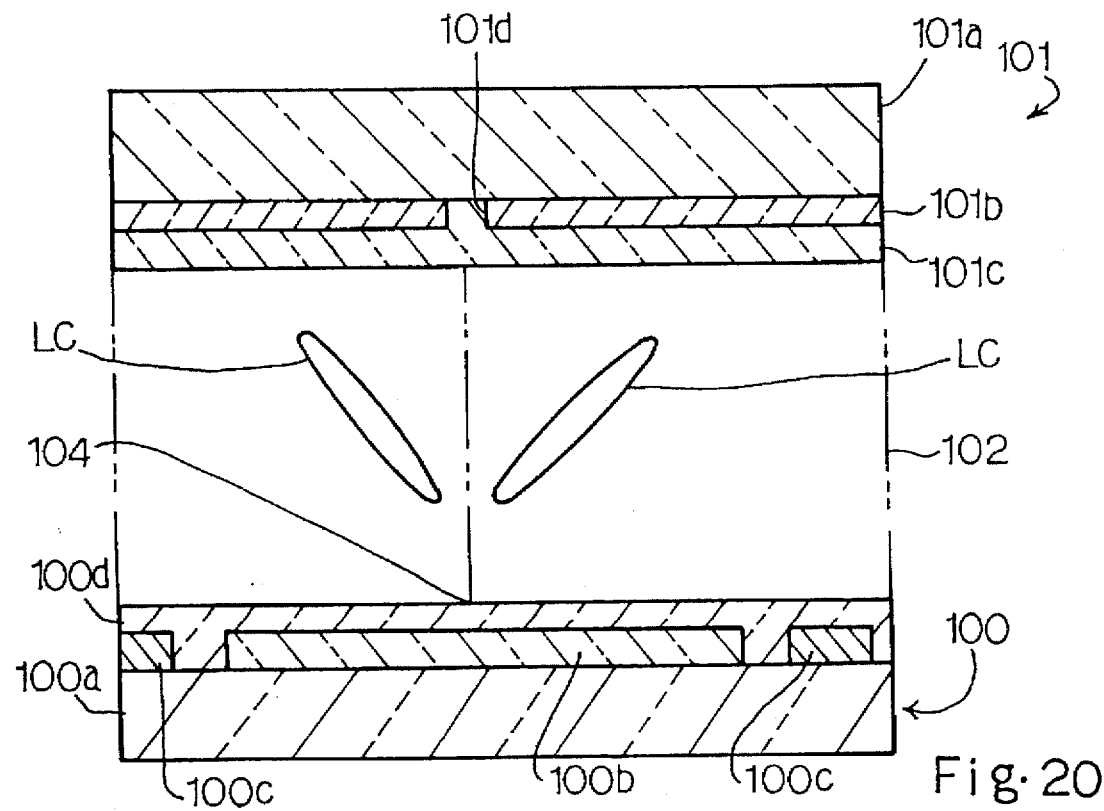
FIG. 20 is a cross sectional view showing the structure over a pixel electrode incorporated in the liquid crystal display panel.

FIGS. 19 and 20 illustrate a part of a liquid crystal display panel embodying the present invention. The liquid crystal display panel largely comprises a first substrate structure 100, a second substrate structure 101 spaced from the first substrate structure 100 and liquid crystal 102 filling a gap between the first substrate structure 100 and the second substrate structure 101.

The first substrate structure 100 includes a transparent substrate 100a, transparent pixel electrodes 100b arranged in lows and columns, switching transistors (not shown) respectively associated with the transparent pixel electrodes 100b, gate bus lines 100c respectively associated with the rows of pixel electrodes 100b and coupled with the gate electrodes of the switching transistors of the associated rows and drain bus lines (not shown) respectively associated with the columns of pixel electrodes 100b and coupled with the drain nodes of the switching transistors of the associated columns. The pixel electrodes 100b, the gate bus lines 100c and the drain bus lines are electrically isolated from one another.

The first substrate structure 100 further includes an orientation layer 100d formed from a polyimide layer of SE-7210 manufactured by Nissan Chemical Corporation, and the orientation layer 100d gives a large pre-tilt angle to the liquid crystal molecules adjacent thereto.

The orientation layer 100d was formed as follows. When the pixel electrodes 100b, the gate bus lines 100c and the drain bus lines were patterned on the transparent substrate 100a, the transparent substrate 100a was washed in pure water, and the polyimide of SE-7210 was spun onto the transparent substrate 100a. The polyimide layer was baked at 200 degrees centigrade for an hour, and was subjected to a first rubbing in one direction.

Photo-resist of OFPR-800C manufactured by Tokyo Applied Chemical Industry Corporation was spun onto the polyimide layer so as to form a photo-resist layer (not shown) of 1 micron thick. The photo-resist layer was baked at 85 degrees centigrade for 30 minutes. The photo-resist layer was exposed through a mask (not shown) to light, and the mask had stripe portions at intervals and, accordingly, stripe open areas therebetween. The boundary between the stripe portion and the open area was aligned with a center line of each pixel electrode 100b, and the mask pattern was transferred to the photo-resist layer.

The photo-resist layer was developed, and was partially removed from half the area of each pixel electrode 100b. The transparent substrate 100a was rinsed in pure water, and was dried at 75 degrees centigrade for 20 minutes.

The present inventors observed the polyimide layer partially covered with the photo-resist layer through a microscope, and confirmed that the half of every pixel electrode was covered with the photo-resist layer.

Figure 21:
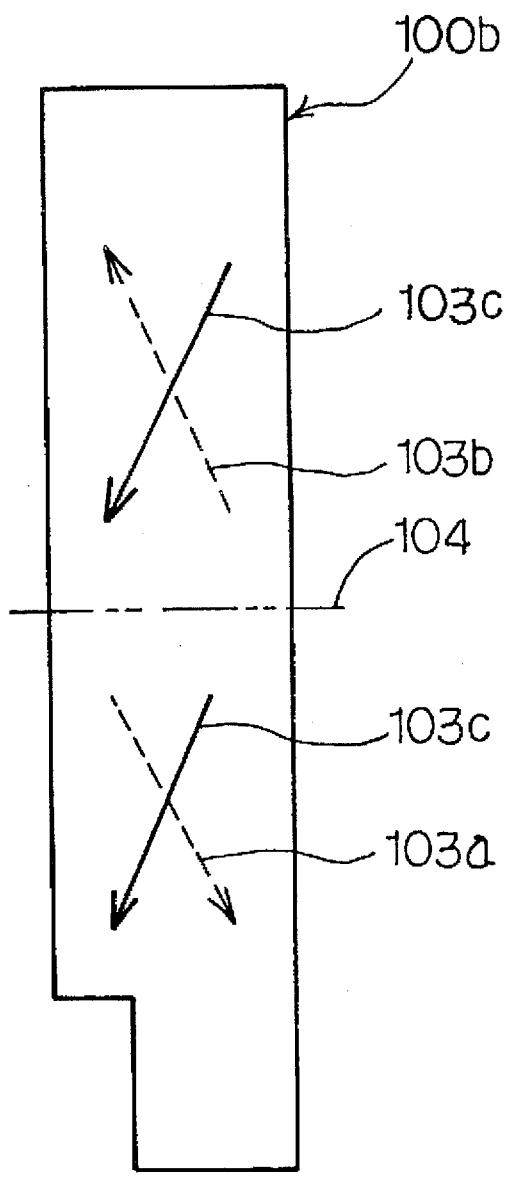
FIG. 21 is a plan view showing relation between the pixel electrode and directions of orientation.
Figure 22:
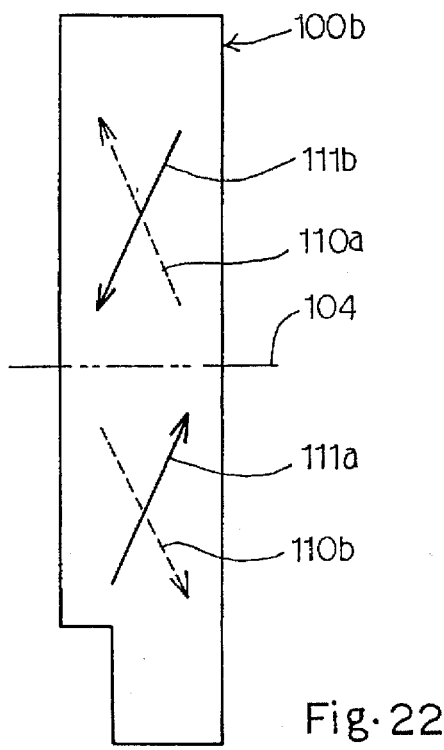
FIG. 22 is a plan view showing relation between a pixel electrode and directions of orientation incorporated in another liquid crystal display panel according to the present invention.

The polyimide. layer was subjected to a second rubbing in the opposite direction to the first rubbing. arrows 103a was indicative of the direction of the first rubbing, and arrow 103b was indicative of the direction of the second rubbing (see FIG. 21).

The transparent substrate 100a was dipped in lactic acid ethyl solution for 2 minutes, and the remaining photo-resist layer was stripped off. The first substrate structure thus formed was rinsed in pure water, and was dried at 110 degrees centigrade 30 minutes.

The orientation layer 100d was divided into stripe areas oriented to one direction and stripe areas oriented to the opposite direction, and the boundary 104 between the stripe areas differently oriented extends over each of the pixel electrodes 100b as shown in FIG. 21.

Turning back to FIG. 20, the second substrate structure 101 includes a transparent substrate 101a of glass, a transparent common electrode 101b formed of indium tin oxide and an orientation layer 101c. Color filters may further provided in the second substrate structure 101.

Rectangular slits 101d are formed in the common electrode 101b. Each rectangular slit 101d is 6 microns in width, and the length of the rectangular slits 101d is as long as the width of the pixel electrodes 100b. The rectangular slits 101d are aligned with the boundaries 104 of the orientation layer 100d. The rectangular slits 101d are desirable because of a large aperture ratio.

Shading members may be incorporated in one of the first and second substrate structures 100 and 101 so as to hide a disclination line. However, it is desirable to form the shading members in the first substrate structure 100, because only the orientation layer 100d is differently oriented in this instance.

The common electrode 101b and the orientation layer 101c was formed as follows. An indium tin oxide layer (not shown) was formed on the transparent substrate 101a, and was rinsed in pure water. An appropriate photo-resist mask (not shown) covered the indium tin oxide layer, and was pre-baked. The photo-resist layer was exposed through an appropriate mask with a slit pattern to light, and the slit pattern was transferred to the photo-resist layer. The photo-resist layer was developed, and rectangular slits were formed in the photo-resist layer. The indium tin oxide layer exposed to the rectangular slits was removed by using a wet etching, and the photo-resist mask was stripped off. The indium tin oxide layer thus patterned was rinsed in pure water.

A polyimide of AL-1051 manufactured by Nippon Synthetic Rubber Corporation was spun onto the common electrode 101b, and the polyimide layer was baked at 200 degrees centigrade for an hour. The polyimide layer was subjected to a rubbing, and the rubbing direction is indicated by arrows 103c in FIG. 21.

The polyimide layer thus oriented serves as the orientation layer 101c, and the orientation layer of the polyimide gives a small pre-tilt angle to the liquid crystal molecules adjacent thereto.

The first and second substrate structures 100 and 101 are regulated such that the rubbing direction 103c crosses the rubbing directions 103a and 103b at 90 degrees. The second substrate structure 101 is spaced from the first substrate structure 100 by 6 microns, and the first and second substrate structures 100 and 101 are bonded through spherical spacers (not shown) to each other.

The stripe areas directly subjected to the second rubbing are larger in pre-tilt angle than the other stripe areas, and the first and second substrate structures 100 and 101 are regulated in such a manner that the stripe areas and the other stripe areas form the standard TN-type deformation regions and the spray TN-type deformation regions.

The gap between the first and second substrate structures 100 and 101 is filled with standard nematic liquid crystal 102 containing a chiral agent, and the nematic liquid crystal 102 is sealed therein. LC stands for liquid crystal molecules on both sides of the boundary 104.

The present inventors evaluated the liquid crystal display panel shown in FIG. 20. A gate control signal was selectively applied to the gate bus lines 100c, and appropriate driving signals were selectively supplied to the drain bus lines. An image was produced over the pixels, and the present inventors observed the liquid crystal by using a polarization microscope. Even though the driving signals were varied, the present inventors confirmed good split orientation in the liquid crystal 102. A disclination line was fixed to the zone under the rectangular slit 101d, and the present inventors confirmed that the disclination line did not move under the variation of the driving signals. The disclination line fell within a narrow range of 12 microns, and was hidden by a shading member as narrow as 12 microns. Therefore, the aperture ratio was large enough to clearly produce the image.

The disclination line fixed under the rectangular slit is derived from electric lines of force between the common electrode 101b and the pixel electrode 100b. When the rectangular slit 101d is formed in the common electrode 101b, the electric lines of force confine the disclination line in the liquid crystal to a location under the rectangular slit 101d.

In fact, even though the lateral electric field between the pixel electrode 100b and the gate/drain bus line 100c was increased, the electric lines of force between the electrodes 100b and 101b did not allow the disclination line to move, and the disclination line was not widely warped.

The present inventors measured the pre-tilt angles on the orientation layers 100d and 101c through the crystal rotation method as similar to the sixth embodiment. For the stripe areas directly subjected to the second rubbing the pre-tilt angle was 6.3 degrees, and for the other stripe areas indirectly subjected to the second rubbing the pre-tilt angle was 4.1 degrees. The pre-tilt angle on the orientation layer 101c was 1 degree.

The present inventors fabricated a fourth comparative liquid crystal display panel similar in structure to the display panel shown in FIG. 20 except for the rectangular slits 101d. A disclination line took place in the fourth comparative liquid crystal display panel without the rectangular slits 101d, and was widely warped. As a result, the disclination line projected from the zone under the shading member of 12 micron in width. This means that the fourth comparative liquid crystal display panel required shading members wider than 12 microns. Moreover, the disclination line extended over several pixel electrodes, and an after image and a burnt image were observed.

The orientation layer 101c may be divided into stripe areas differently oriented as similar to the orientation layer 100d.

As will be appreciated from the foregoing description, the rectangular slits 101d cause the electric lines of force between the electrodes 100b and 101b to confine the disclination line to the liquid crystal thereunder, and improves the picture quality without sacrifice of the aperture ratio.

Eleventh Embodiment

Another liquid crystal display panel embodying the present invention is similar in structure to the tenth embodiment except for the standard TN deformation regions and the spray TN deformation regions. In this instance, the stripe areas indirectly subjected to the second rubbing form the standard TN deformation regions, and the other stripe areas directly subjected to the second rubbing form the spray TN deformation regions.

In the fabrication process, the first rubbing was carried out in the direction indicated by the arrow 103b, and the second rubbing was carried out in the direction indicated by the arrow 103a.

The present inventors evaluated the liquid crystal display panel implementing the eleventh embodiment, and confirmed the good split orientation and the disclination lines fixed under the rectangular slits 101d. The disclination lines fell within a narrow range of 6 microns. The reduction in aperture ratio due to the shading members was acceptable. Even if the driving signals were changed in magnitude, the disclination lines did not move.

The present inventors fabricated a fifth comparative liquid crystal display panel. The fifth comparative display panel was similar in structure to the eleventh embodiment except for the rectangular slits 101d. Namely, the common electrode 101b did not have any rectangular slit. An image was produced over the pixels. Although the image was clearer than the image on the fourth comparative liquid crystal display panel, the disclination lines were warped wider than the eleventh embodiment. Therefore, the disclination lines projected from the liquid crystal under the shading members of 12 microns in width.

Twelfth Embodiment

A liquid crystal display panel implementing the twelfth embodiment is similar in structure to the tenth embodiment except for the orientation film 101c. The orientation film 101c of the twelfth embodiment is divided into stripe areas differently oriented as similar to the orientation layer 100d. The orientation layer 100d is subjected to the first rubbing in a direction indicated by an arrow 110a and, thereafter, is subjected to second rubbing in the opposite direction indicated by an arrow 110b. On the other hand, a orientation layer 101c is subjected to the first rubbing in a direction indicated by an arrow 111a and, thereafter, is subjected to second rubbing in a direction indicated by an arrow 111b.

The first and second substrate structures are regulated in such a manner that the stripe areas form the TN deformation regions, and are bonded through spherical spacers to each other. The directions of orientation 110a and 110b cross the directions of orientation 111b and 111a at 90 degrees, and a gap between the first and second substrate structures 100 and 101 is 6 microns. Nematic liquid crystal fills the gap between the first substrate structure 100 and the second substrate structure 101.

The present inventors evaluated the liquid crystal display panel implementing the twelfth embodiment. First, the present inventors confirmed good orientation of the liquid crystal by using a polarization microscope, and the variation of the driving signal did not have an adverse influence on the orientation. The present inventors further confirmed disclination lines confined under the rectangular slits 101d, and the disclination lines fell within 6 microns. The reduction in aperture ratio due to the shading members was acceptable.

The present inventors fabricated a sixth comparative liquid crystal display panel which was similar to the twelfth embodiment except for the rectangular slits 101d. Disclination lines were warped, and projected into the open areas over several pixel electrodes. The disclination lines fell within 12 microns, and deteriorated the picture quality.

Thirteenth Embodiment

A liquid crystal display panel implementing the thirteenth embodiment is similar to the eleventh embodiment except for the orientation layer 100d. The orientation layer 100d of the thirteenth embodiment is formed from a polyimide layer of RN-715 manufactured by Nissan Chemical Corporation. The pre-tilt angles of the differently oriented stripe areas are changed relative to one another, and the stripe areas for the large pre-tilt angle and the other stripe areas for the small pre-tilt angle form the spray TN deformation regions and the standard TN deformation regions, respectively.

The present inventors evaluated the liquid crystal display panel implementing the thirteenth embodiment. the present inventors confirmed good orientation of the liquid crystal at any magnitude of the driving signal and disclination lines stably confined under the rectangular slits 101d. The disclination lines fell within 10 microns, and a large aperture ratio was achieved.

The present inventors measured the pre-tilt angles as similar to the tenth embodiment through the crystal rotation method. The pre-tilt angle for the stripe areas indirectly subjected to the second rubbing was 12 degrees, and the pre-tilt angle for the other stripe areas was 9 degrees.

Fourteenth Embodiment

A liquid crystal display panel implementing the fourteenth embodiment is similar in structure to the eleventh embodiment except for the shading members incorporated in the first substrate structure 100. The shading members are aligned with the center lines of the pixel electrodes 100b, and are 12 microns in width. The split orientation of liquid crystal was good, and disclination lines were hidden by the shading members.

Fifteenth Embodiment

A liquid crystal display panel implementing the fifteenth embodiment is similar to the eleventh embodiment except for the configuration of the slit 101d. The slits 101d of the tenth to fourteenth embodiments have a length equal to the width of the pixel electrodes 100b. However, although the width is 6 microns, the slits of the fifteenth embodiment were elongated over the pixel electrodes. The split orientation was good, and disclination lines fell within 6 microns. Shading members of 10 microns wide perfectly hid the disclination lines.

Sixteenth Embodiment

Figure 23:
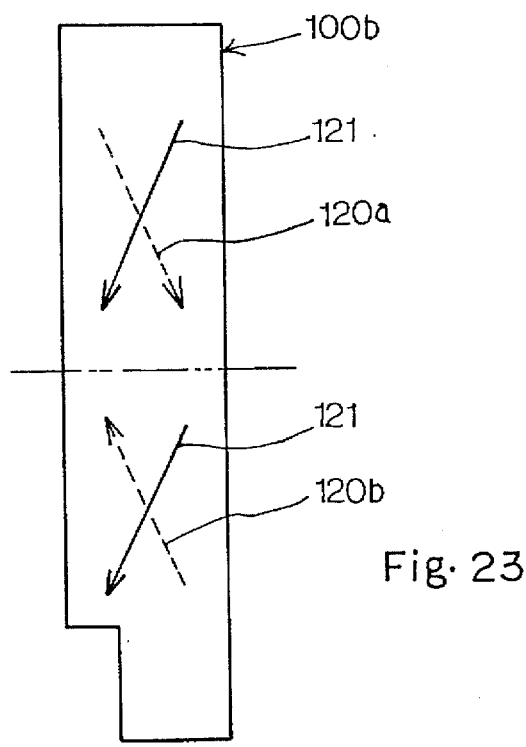
FIG. 23 is a plan view showing relation between a pixel electrode and directions of orientation incorporated in yet another liquid crystal display panel according to the present invention.

A liquid crystal display panel implementing the sixteenth embodiment is similar to the tenth embodiment except for the directions of rubbing. The stripe areas of the orientation layer 100d are subjected to the first rubbing in a direction indicated in FIG. 23 by an arrow 120a, and the other stripe areas are subjected to the second rubbing in a direction indicated by an arrow 120b. The orientation layer 101c is subjected to a rubbing in a direction indicated by an arrow 121.

In this instance, the director boundary does not take place in the central area of the pixel electrode 100b but in the end portion thereof. For this reason, the slits 101d are formed in the areas opposed to the end portions, and are aligned with the boundaries between every two differently oriented stripe areas.

The present inventors confirmed good split orientation and disclination lines confined under the slits.

The present inventors fabricated a comparative liquid crystal display panel similar to the sixteenth embodiment except for the slits. Disclination lines projected from the liquid crystal under the slits, and connected to one another. As a result, a burnt image was observed.

Although particular embodiments of the present invention have been shown and described, it will be obvious to those skilled in the art that various changes and modifications may be made without departing from the spirit and scope of the present invention.

What is claimed is:

1. A liquid crystal display apparatus comprising:
a first substrate structure including
a plurality of gate bus lines,
a plurality of drain bus lines electrically isolated from said plurality of gate bus lines and defining a plurality of areas together with said plurality of gate bus lines,
a plurality of pixel electrodes respectively formed in said plurality of areas and electrically isolated from said plurality of gate bus lines and said plurality of drain bus lines,
a plurality of switching transistors respectively associated with said plurality of pixel electrodes, each of said plurality of switching transistors having a source-to-drain path coupled between an associated one of said plurality of pixel electrodes and one of said drain bus lines and a gate coupled to one of said plurality of gate bus lines, and a first orientation film covering said plurality of gate bus lines, said plurality of drain bus lines, said plurality of pixel electrodes and said plurality of switching transistors and divided into a plurality of sub-areas every adjacent two of which are oriented in different directions, said plurality of sub-areas forming first boundaries extending over said plurality of pixel electrodes and second boundaries each extending over an area between one of said plurality of pixel electrodes and one of the gate bus line and the drain bus line coupled to one of said plurality of switching transistors associated with said one of said plurality of pixel electrodes;

a second substrate structure including a common electrode opposed to said plurality of pixel electrodes, and a second orientation film covering said common electrode and forming a gap together with said first orientation film; and liquid crystal filling said gap.

2. The liquid crystal display apparatus as set forth in claim 1, in which said plurality of gate bus lines are partially overlapped through an insulating layer with said plurality of pixel electrodes so as to form storage capacitors, and each of said second boundaries extends between one of said plurality of gate bus lines and pixel electrodes of said plurality of pixel electrodes associated with switching transistors coupled to said one of said plurality of gate bus lines.

3. The liquid crystal display apparatus as set forth in claim 1, in which said liquid crystal contains first liquid crystal molecules on one side of one of said second boundaries and second liquid crystal molecules on the other side of said one of said second boundaries, each of said first liquid crystal molecules having one end closer to said one of said second boundaries than the other end thereof, said one end of the first liquid crystal molecule being closer to said second substrate structure than said other end, each of said second liquid crystal molecules having one end closer to said one of said second boundaries than the other end thereof, said one end of the second liquid crystal molecule being closer to said second substrate structure than said other end.

4. The liquid crystal display apparatus as set forth in claim 1, in which said plurality of sub-areas further form third boundaries each extending over another area between said one of said pixel electrodes and the other of said gate bus line and said drain bus line.

5. The liquid crystal display apparatus as set forth in claim 4, in which said liquid crystal contains first liquid crystal molecules on one side of one of said second boundaries and second liquid crystal molecules on the other side of said one of said second boundaries, third liquid crystal molecules on one side of one of said third boundaries and fourth liquid crystal molecules on the other side of said one of said third boundaries, each of said first liquid crystal molecules having one end closer to said one of said second boundaries than the other end thereof, said one end of the first liquid crystal molecule being closer to said second substrate structure than said other end, each of said second liquid crystal molecules having one end closer to said one of said second boundaries than the other end thereof, said one end of the second liquid crystal molecule being closer to said second substrate structure than said other end, each of said third liquid crystal molecules having one end closer to said one of said third boundaries than the other end thereof, said one end of the third liquid crystal molecule being closer to said second substrate structure than said other end, each of said fourth liquid crystal molecules having one end closer to said one of said third boundaries than the other end thereof, said one end of the fourth liquid crystal molecule being closer to said second substrate structure than said other end.

6. A display apparatus as set forth in claim 1, wherein said orientation films confine a disclination line to a position at said second boundaries.

* * * * *